US008602875B2

(12) United States Patent
Nguyen

(10) Patent No.: US 8,602,875 B2
(45) Date of Patent: Dec. 10, 2013

(54) PRESERVING GAME STATE DATA FOR ASYNCHRONOUS PERSISTENT GROUP BONUS GAMES

(75) Inventor: Binh T. Nguyen, Reno, NV (US)

(73) Assignee: Nguyen Gaming LLC, Reno, NV (US)

( * ) Notice: Subject to any disclaimer, the term of this patent is extended or adjusted under 35 U.S.C. 154(b) by 360 days.

(21) Appl. No.: 12/581,115

(22) Filed: Oct. 17, 2009

(65) Prior Publication Data

US 2011/0092271 A1 Apr. 21, 2011

(51) Int. Cl.
*A63F 9/24* (2006.01)
*A63F 13/00* (2006.01)

(52) U.S. Cl.
USPC .................. 463/25; 463/16; 463/17; 463/18; 463/19; 463/20; 463/26; 463/27; 463/39; 463/40; 463/41; 463/42; 463/43

(58) Field of Classification Search
USPC .............................. 463/16–20, 25–27, 39–43
See application file for complete search history.

(56) References Cited

U.S. PATENT DOCUMENTS

| | | | |
|---|---|---|---|
| 2,033,638 | A | 3/1936 | Koppl |
| 2,062,923 | A | 12/1936 | Nagy |
| 4,741,539 | A | 5/1988 | Sutton et al. |
| 4,948,138 | A | 8/1990 | Pease et al. |
| 5,067,712 | A | 11/1991 | Georgilas |
| 5,429,361 | A | 7/1995 | Raven et al. |
| 5,655,961 | A | 8/1997 | Acres et al. |
| 5,704,835 | A | 1/1998 | Dietz, II |
| 5,727,786 | A | 3/1998 | Weingardt |
| 5,833,537 | A | 11/1998 | Barrie |
| 5,919,091 | A | 7/1999 | Bell et al. |
| 5,947,820 | A | 9/1999 | Morro et al. |
| 5,997,401 | A | 12/1999 | Crawford |
| 6,001,016 | A | 12/1999 | Walker et al. |
| 6,039,648 | A | 3/2000 | Guinn et al. |
| 6,059,289 | A | 5/2000 | Vancura |
| 6,089,977 | A | 7/2000 | Bennett |
| 6,095,920 | A | 8/2000 | Sadahiro |
| 6,110,041 | A | 8/2000 | Walker et al. |
| 6,142,872 | A | 11/2000 | Walker et al. |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Benston, Liz, "Harrahs Launches iPhone App; Caesars Bypasses Check-in," Las Vegas Sun, Las Vegas, NV. Jan. 8, 2010.

(Continued)

*Primary Examiner* — Arthur O. Hall
*Assistant Examiner* — Jasson Yoo

(57) ABSTRACT

A system, apparatus, and method for preserving game state data for an asynchronous persistent group bonus game may have a plurality of gaming machines associated with the asynchronous persistent group bonus game and at least one network server having at least one processor and at least one non-volatile memory. The processor may be configured to determine whether a bonus game session is triggered on any of the plurality of gaming machines; and if the bonus game session is triggered, display live game monitor activities, and periodically save the persistent bonus game state and other data on the at least one non-volatile memory.

25 Claims, 13 Drawing Sheets

(56) References Cited

U.S. PATENT DOCUMENTS 6,146,273 A 11/2000 Olsen
6,165,071 A 12/2000 Weiss
6,231,445 B1 5/2001 Acres
6,270,412 B1 8/2001 Crawford et al.
6,290,600 B1 9/2001 Glasson
6,293,866 B1 9/2001 Walker et al.
6,353,390 B1 3/2002 Beri et al.
6,364,768 B1 4/2002 Acres et al.
6,416,406 B1 7/2002 Duhamel
6,416,409 B1 7/2002 Jordan
6,443,452 B1 9/2002 Brune
6,491,584 B2 12/2002 Graham et al.
6,505,095 B1 1/2003 Kolls
6,561,900 B1 5/2003 Baerlocher et al.
6,592,457 B1 7/2003 Frohm et al.
6,612,574 B1 9/2003 Cole et al.
6,620,046 B2 9/2003 Rowe
6,641,477 B1 11/2003 Dietz, II
6,645,078 B1 11/2003 Mattice
6,719,630 B1 4/2004 Seelig et al.
6,758,757 B2 7/2004 Luciano et al.
6,773,345 B2 8/2004 Walker et al.
6,778,820 B2 8/2004 Tendler
6,780,111 B2 8/2004 Cannon et al.
6,799,032 B2 9/2004 McDonnell et al.
6,800,027 B2 10/2004 Giobbi et al.
6,804,763 B1 10/2004 Stockdale et al.
6,811,486 B1 11/2004 Luciano, Jr.
6,843,725 B2 1/2005 Nelson
6,846,238 B2 1/2005 Wells
6,848,995 B1 2/2005 Walker et al.
6,852,029 B2 2/2005 Baltz et al.
6,869,361 B2 3/2005 Sharpless et al.
6,875,106 B2 4/2005 Weiss et al.
6,884,170 B2 4/2005 Rowe
6,884,172 B1 * 4/2005 Lloyd et al. .................... 463/42
6,902,484 B2 6/2005 Idaka
6,908,390 B2 6/2005 Nguyen et al.
6,913,532 B2 7/2005 Baerlocher et al.
6,923,721 B2 8/2005 Luciano et al.
6,935,958 B2 8/2005 Nelson
6,955,600 B2 10/2005 Glavich et al.
6,971,956 B2 12/2005 Rowe et al.
6,984,174 B2 1/2006 Cannon et al.
6,997,803 B2 2/2006 LeMay et al.
7,018,292 B2 3/2006 Tracy et al.
7,033,276 B2 4/2006 Walker et al.
7,035,626 B1 4/2006 Luciano
7,037,195 B2 5/2006 Schneider et al.
7,048,628 B2 5/2006 Schneider
7,048,630 B2 5/2006 Berg et al.
7,063,617 B2 6/2006 Brosnan et al.
7,076,329 B1 7/2006 Kolls
7,089,264 B1 8/2006 Guido et al.
7,094,148 B2 8/2006 Baerlocher et al.
7,105,736 B2 9/2006 Laakso
7,111,141 B2 9/2006 Nelson
7,144,321 B2 12/2006 Mayeroff
7,152,783 B2 12/2006 Charrin
7,169,041 B2 1/2007 Tessmer et al.
7,169,052 B2 1/2007 Beaulieu et al.
7,175,523 B2 2/2007 Gilmore et al.
7,181,228 B2 2/2007 Boesch
7,182,690 B2 2/2007 Giobbi et al.
RE39,644 E 5/2007 Alcorn et al.
7,243,104 B2 7/2007 Bill
7,247,098 B1 7/2007 Bradford et al.
7,259,718 B2 8/2007 Patterson et al.
7,275,989 B2 10/2007 Moody
7,285,047 B2 10/2007 Gielb et al.
7,314,408 B2 1/2008 Cannon et al.
7,316,615 B2 1/2008 Soltys et al.
7,316,619 B2 1/2008 Nelson
7,318,775 B2 1/2008 Brosnan et al.
7,326,116 B2 2/2008 O'Donovan et al.
7,330,108 B2 2/2008 Thomas
7,346,358 B2 3/2008 Wood et al.
7,355,112 B2 4/2008 Laakso
7,384,338 B2 6/2008 Rothschild et al.
7,387,571 B2 6/2008 Walker et al.
7,393,278 B2 7/2008 Gerson et al.
7,396,990 B2 7/2008 Lu et al.
7,415,426 B2 8/2008 Williams et al.
7,425,177 B2 9/2008 Rodgers et al.
7,427,234 B2 9/2008 Soltys et al.
7,427,236 B2 9/2008 Kaminkow et al.
7,427,708 B2 9/2008 Ohmura
7,448,949 B2 11/2008 Kaminkow et al.
7,500,913 B2 3/2009 Baerlocher
7,510,474 B2 3/2009 Carter
7,513,828 B2 4/2009 Nguyen et al.
7,559,838 B2 7/2009 Walker et al.
7,563,167 B2 7/2009 Walker et al.
7,572,183 B2 8/2009 Olivas et al.
7,585,222 B2 9/2009 Muir
7,602,298 B2 10/2009 Thomas
7,607,174 B1 10/2009 Kashchenko et al.
7,611,409 B2 11/2009 Muir et al.
7,637,810 B2 12/2009 Amaitis et al.
7,644,861 B2 1/2010 Alderucci et al.
7,699,703 B2 4/2010 Muir et al.
7,722,453 B2 5/2010 Lark et al.
7,758,423 B2 7/2010 Foster et al.
7,771,271 B2 8/2010 Walker et al.
7,780,529 B2 8/2010 Rowe et al.
7,780,531 B2 8/2010 Englman et al.
7,785,192 B2 8/2010 Canterbury et al.
7,811,172 B2 10/2010 Asher et al.
7,822,688 B2 10/2010 Labrou
7,828,652 B2 11/2010 Nguyen et al.
7,828,654 B2 11/2010 Carter
7,850,528 B2 12/2010 Wells
7,874,919 B2 1/2011 Paulsen et al.
7,877,798 B2 1/2011 Saunders et al.
7,883,413 B2 2/2011 Paulsen
7,892,097 B2 2/2011 Muir et al.
7,909,692 B2 3/2011 Nguyen et al.
7,909,699 B2 3/2011 Parrott et al.
7,918,728 B2 4/2011 Nguyen et al.
7,927,211 B2 4/2011 Rowe et al.
7,927,212 B2 4/2011 Hedrick et al.
7,951,008 B2 5/2011 Wolf et al.
8,057,298 B2 11/2011 Nguyen et al.
8,057,303 B2 11/2011 Rasmussen
8,087,988 B2 1/2012 Nguyen et al.
8,226,459 B2 7/2012 Barrett
8,226,474 B2 7/2012 Nguyen et al.
8,231,456 B2 7/2012 Zielinski
8,235,803 B2 8/2012 Loose et al.
8,282,475 B2 10/2012 Nguyen et al.
8,323,099 B2 12/2012 Durham et al.
8,337,290 B2 12/2012 Nguyen et al.
2002/0111210 A1 8/2002 Luciano, Jr. et al.
2002/0111213 A1 8/2002 McEntee et al.
2002/0113369 A1 8/2002 Weingardt
2002/0133418 A1 9/2002 Hammond et al.
2002/0147047 A1 10/2002 Letovsky et al.
2002/0147049 A1 10/2002 Carter, Sr.
2002/0151366 A1 10/2002 Walker et al.
2002/0167536 A1 11/2002 Valdes et al.
2003/0001338 A1 1/2003 Bennett et al.
2003/0008696 A1 1/2003 Abecassis et al.
2003/0027635 A1 2/2003 Walker et al.
2003/0064805 A1 4/2003 Wells
2003/0064807 A1 4/2003 Walker et al.
2003/0092480 A1 5/2003 White et al.
2003/0100361 A1 5/2003 Sharpless et al.
2003/0104865 A1 6/2003 Itkis et al.
2003/0162588 A1 8/2003 Brosnan et al.
2003/0199295 A1 10/2003 Vancura
2003/0224852 A1 * 12/2003 Walker et al. .................. 463/20
2004/0002386 A1 1/2004 Wolfe et al.
2004/0023709 A1 2/2004 Beaulieu et al.
2004/0023716 A1 2/2004 Gauselmann

(56) References Cited

U.S. PATENT DOCUMENTS

| | | | | |
|---|---|---|---|---|
| 2004/0048650 | A1 | 3/2004 | Mierau et al. | |
| 2004/0082385 | A1 | 4/2004 | Silva et al. | |
| 2004/0106449 | A1 | 6/2004 | Walker et al. | |
| 2004/0137987 | A1 | 7/2004 | Nguyen et al. | |
| 2004/0147308 | A1 | 7/2004 | Walker et al. | |
| 2004/0224753 | A1 | 11/2004 | Odonovan et al. | |
| 2004/0256803 | A1 | 12/2004 | Ko | |
| 2005/0003890 | A1 | 1/2005 | Hedrick et al. | |
| 2005/0004980 | A1 | 1/2005 | Vadjinia | |
| 2005/0101376 | A1 | 5/2005 | Walker et al. | |
| 2005/0130728 | A1 | 6/2005 | Nguyen et al. | |
| 2005/0187570 | A1 | 8/2005 | Nguyen et al. | |
| 2005/0277471 | A1 | 12/2005 | Russell et al. | |
| 2006/0009283 | A1 * | 1/2006 | Englman et al. ................ | 463/29 |
| 2006/0046822 | A1 | 3/2006 | Kaminkow et al. | |
| 2006/0046830 | A1 | 3/2006 | Webb | |
| 2006/0046849 | A1 | 3/2006 | Kovacs | |
| 2006/0068893 | A1 | 3/2006 | Jaffe et al. | |
| 2006/0073869 | A1 | 4/2006 | LeMay et al. | |
| 2006/0073897 | A1 * | 4/2006 | Englman et al. ................ | 463/42 |
| 2006/0148551 | A1 | 7/2006 | Walker et al. | |
| 2006/0217193 | A1 | 9/2006 | Walker et al. | |
| 2006/0247028 | A1 | 11/2006 | Brosnan et al. | |
| 2006/0247035 | A1 | 11/2006 | Rowe et al. | |
| 2006/0252530 | A1 | 11/2006 | Oberberger et al. | |
| 2006/0253481 | A1 | 11/2006 | Guido et al. | |
| 2006/0281525 | A1 | 12/2006 | Borissov | |
| 2006/0281541 | A1 | 12/2006 | Nguyen et al. | |
| 2007/0004510 | A1 | 1/2007 | Underdahl et al. | |
| 2007/0060254 | A1 | 3/2007 | Muir | |
| 2007/0060358 | A1 | 3/2007 | Amaitis et al. | |
| 2007/0077981 | A1 | 4/2007 | Hungate et al. | |
| 2007/0087833 | A1 | 4/2007 | Feeney et al. | |
| 2007/0087834 | A1 | 4/2007 | Moser et al. | |
| 2007/0149286 | A1 | 6/2007 | Bemmel | |
| 2007/0159301 | A1 | 7/2007 | Brown | |
| 2007/0161402 | A1 | 7/2007 | Ng. et al. | |
| 2007/0184904 | A1 | 8/2007 | Lee | |
| 2007/0191109 | A1 | 8/2007 | Crowder et al. | |
| 2007/0207852 | A1 | 9/2007 | Nelson et al. | |
| 2007/0207854 | A1 | 9/2007 | Wolf et al. | |
| 2007/0241187 | A1 | 10/2007 | Alderucci et al. | |
| 2007/0248036 | A1 | 10/2007 | Nevalainen | |
| 2007/0257430 | A1 | 11/2007 | Hardy et al. | |
| 2007/0259713 | A1 | 11/2007 | Fiden et al. | |
| 2007/0259717 | A1 | 11/2007 | Mattice et al. | |
| 2007/0270213 | A1 | 11/2007 | Nguyen et al. | |
| 2007/0275777 | A1 | 11/2007 | Walker et al. | |
| 2007/0275779 | A1 | 11/2007 | Amaitis et al. | |
| 2007/0281782 | A1 | 12/2007 | Amaitis et al. | |
| 2007/0281785 | A1 | 12/2007 | Amaitis et al. | |
| 2008/0015032 | A1 | 1/2008 | Bradford et al. | |
| 2008/0020824 | A1 | 1/2008 | Cuddy et al. | |
| 2008/0032787 | A1 | 2/2008 | Low et al. | |
| 2008/0070652 | A1 | 3/2008 | Nguyen et al. | |
| 2008/0070681 | A1 | 3/2008 | Marks et al. | |
| 2008/0076506 | A1 | 3/2008 | Nguyen et al. | |
| 2008/0076548 | A1 | 3/2008 | Paulsen | |
| 2008/0076572 | A1 | 3/2008 | Nguyen et al. | |
| 2008/0096650 | A1 | 4/2008 | Baerlocher | |
| 2008/0102956 | A1 | 5/2008 | Burman et al. | |
| 2008/0102957 | A1 | 5/2008 | Burman et al. | |
| 2008/0113772 | A1 | 5/2008 | Burrill et al. | |
| 2008/0119267 | A1 | 5/2008 | Denlay | |
| 2008/0146321 | A1 | 6/2008 | Parente | |
| 2008/0150902 | A1 | 6/2008 | Edpalm et al. | |
| 2008/0153583 | A1 | 6/2008 | Huntley et al. | |
| 2008/0167106 | A1 | 7/2008 | Lutnick et al. | |
| 2008/0182667 | A1 | 7/2008 | Davis et al. | |
| 2008/0207307 | A1 | 8/2008 | Cunningham II et al. | |
| 2008/0214258 | A1 | 9/2008 | Brosnan et al. | |
| 2008/0238610 | A1 | 10/2008 | Rosenberg | |
| 2008/0254878 | A1 | 10/2008 | Saunders et al. | |
| 2008/0254881 | A1 | 10/2008 | Lutnick et al. | |
| 2008/0254891 | A1 | 10/2008 | Saunders et al. | |
| 2008/0254892 | A1 | 10/2008 | Saunders et al. | |
| 2008/0254897 | A1 | 10/2008 | Saunders et al. | |
| 2008/0300058 | A1 | 12/2008 | Sum et al. | |
| 2008/0305864 | A1 | 12/2008 | Kelly et al. | |
| 2008/0305865 | A1 | 12/2008 | Kelly et al. | |
| 2008/0305866 | A1 | 12/2008 | Kelly et al. | |
| 2008/0311994 | A1 | 12/2008 | Amaitis et al. | |
| 2008/0318686 | A1 | 12/2008 | Crowder et al. | |
| 2009/0005165 | A1 | 1/2009 | Arezina et al. | |
| 2009/0029766 | A1 | 1/2009 | Lutnick et al. | |
| 2009/0054149 | A1 | 2/2009 | Brosnan et al. | |
| 2009/0088258 | A1 | 4/2009 | Saunders et al. | |
| 2009/0098925 | A1 | 4/2009 | Gagner et al. | |
| 2009/0104977 | A1 | 4/2009 | Zielinski | |
| 2009/0104983 | A1 | 4/2009 | Okada | |
| 2009/0118013 | A1 | 5/2009 | Finnimore et al. | |
| 2009/0118022 | A1 | 5/2009 | Lyons et al. | |
| 2009/0124366 | A1 | 5/2009 | Aoki et al. | |
| 2009/0131151 | A1 | 5/2009 | Harris et al. | |
| 2009/0132163 | A1 | 5/2009 | Ashley et al. | |
| 2009/0137255 | A1 | 5/2009 | Ashley et al. | |
| 2009/0149245 | A1 | 6/2009 | Fabbri | |
| 2009/0149261 | A1 | 6/2009 | Chen et al. | |
| 2009/0156303 | A1 | 6/2009 | Kiely et al. | |
| 2009/0176578 | A1 | 7/2009 | Herrmann et al. | |
| 2009/0191962 | A1 | 7/2009 | Hardy et al. | |
| 2009/0197684 | A1 | 8/2009 | Arezina et al. | |
| 2009/0216547 | A1 | 8/2009 | Canora et al. | |
| 2009/0219901 | A1 | 9/2009 | Bull et al. | |
| 2009/0221342 | A1 | 9/2009 | Katz et al. | |
| 2009/0227302 | A1 | 9/2009 | Abe | |
| 2009/0264190 | A1 | 10/2009 | Davis et al. | |
| 2010/0002897 | A1 | 1/2010 | Keady | |
| 2010/0004058 | A1 * | 1/2010 | Acres .............................. | 463/27 |
| 2010/0056248 | A1 | 3/2010 | Acres | |
| 2010/0062833 | A1 | 3/2010 | Mattice et al. | |
| 2010/0099499 | A1 | 4/2010 | Amaitis et al. | |
| 2010/0124967 | A1 | 5/2010 | Lutnick et al. | |
| 2010/0160043 | A1 | 6/2010 | Fujimoto et al. | |
| 2010/0197383 | A1 | 8/2010 | Rad et al. | |
| 2010/0227670 | A1 | 9/2010 | Arezina et al. | |
| 2010/0323780 | A1 | 12/2010 | Acres | |
| 2011/0039615 | A1 | 2/2011 | Acres | |
| 2011/0065492 | A1 | 3/2011 | Acres | |
| 2011/0111860 | A1 | 5/2011 | Nguyen | |
| 2011/0118010 | A1 | 5/2011 | Brune | |
| 2011/0223993 | A1 | 9/2011 | Allen et al. | |
| 2011/0263318 | A1 | 10/2011 | Agarwal et al. | |
| 2011/0306400 | A1 | 12/2011 | Nguyen | |
| 2012/0015709 | A1 | 1/2012 | Bennett et al. | |
| 2012/0094769 | A1 | 4/2012 | Nguyen et al. | |
| 2012/0108319 | A1 | 5/2012 | Caputo et al. | |
| 2012/0122567 | A1 | 5/2012 | Gangadharan et al. | |
| 2012/0122584 | A1 | 5/2012 | Nguyen | |
| 2012/0172130 | A1 | 7/2012 | Acres | |
| 2012/0190426 | A1 | 7/2012 | Acres | |
| 2012/0194448 | A1 | 8/2012 | Rothkopf | |
| 2012/0322563 | A1 | 12/2012 | Nguyen et al. | |
| 2012/0330740 | A1 | 12/2012 | Pennington et al. | |
| 2013/0005433 | A1 | 1/2013 | Holch | |
| 2013/0005453 | A1 | 1/2013 | Nguyen et al. | |
| 2013/0059650 | A1 | 3/2013 | Sylia et al. | |
| 2013/0065668 | A1 | 3/2013 | LeMay et al. | |

FOREIGN PATENT DOCUMENTS

| | | |
|---|---|---|
| GB | 2096376 | 10/1982 |
| GB | 2097570 | 11/1982 |
| GB | 2335524 | 9/1999 |
| WO | WO 2005073933 | 8/2005 |
| WO | WO 2008/027621 | 5/2007 |
| WO | WO 2009/062148 | 3/2008 |
| WO | WO 2009/026309 | 2/2010 |

OTHER PUBLICATIONS

Finnegan, Amanda, "Casinos Connecting with Customers via Iphone Apps", May 27, 2010, Las Vegas Sun, Las Vegas, NV.

(56) References Cited

OTHER PUBLICATIONS

Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Ilinois at Urbana Champain, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
iAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/961,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 13/801,076, filed Mar. 13, 2013.
U.S. Appl. No. 13/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar. 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/961,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, mailed Aug. 23, 2013.

* cited by examiner

PRESERVING GAME STATE DATA FOR ASYNCHRONOUS PERSISTENT GROUP BONUS GAMES

FIELD OF THE INVENTION

The present disclosure relates generally to the field of gaming systems, and more particularly to preserving or saving game state data for bonus games in gaming machines.

BACKGROUND OF THE INVENTION

In gaming machines, an award is based on the player obtaining a winning symbol or symbol combination and on the amount of the wager (e.g., the higher the wager, the higher the award). Generally, symbols or symbol combinations that are less likely to occur provide higher awards. Secondary or bonus games usually provide an additional award to the player. Secondary or bonus games usually do not require an additional wager by the player to be activated and are generally activated by a triggering symbol or a triggering symbol combination in the primary or base game. For instance, bonus symbols occurring in specific patterns on reels of a slot machine may trigger a secondary bonus game.

Certain awards may also be available to multiple gaming machines or groups of gaming machines, such as progressive awards. In one form, a progressive award is an award amount that includes an initial amount funded by a casino and an additional amount funded through a portion of each wager made on the progressive award associated with the gaming machine. For example, one percent of each wager on the primary game of the gaming machine may be allocated to the progressive award or progressive award fund.

Certain types of game play data from gaming machines are often stored in gaming machines such as games won, credits remaining, prizes paid out. Such data may be necessary to calculate revenue and profits, to calculate a machine's hold percentage, reconcile accounting, and to address disputes that players may have with a casino over whether or not a winning combination occurred, the amount of payout due, and the like. Further, casino operators and/or gaming regulators may sometime need the same or related information for other reasons such as examining the sequence of events prior to a malfunction, verifying the electronic "signature" of software and/or firmware; reviewing the complete history of past games, and the like.

Among the types of commonly preserved data is so-called "critical data" or "critical game information," which must be maintained by casinos. Such data as game state, credits bet, number of lines bet, credits remain, random number generator results, number of games played, and the like may be stored as simple text and/or graphics inside the slot machine. In some cases, entire frames of video data may be captured and stored. Gaming regulators, such as the Nevada Gaming Commission, may require that gaming machines save critical data for a certain length of time or a set number of games before allowing older critical data to be overwritten or purged from a gaming machine or network server. To this end, gaming machine manufacturers sometimes store such data in battery-backed non-volatile random access memory. This allows critical data to be preserved even in the event of a loss of primary power, during transport or relocation, or while the machine is intentionally turned off for service.

In the recent years, casino games where multiple players sharing a bonus game was also introduced. Typically, five to eight slot machines surround a shared bonus screen. Occasionally, when the bonus game is triggered, and one or more players may optionally participate in the bonus game. However, the bonus game lasts for only a few seconds, and the passive player(s) do not interact with the bonus game. Without interaction with the bonus game, without interaction between players, and with the brief nature of the group bonus game and the small number of players in a group participating simultaneously, the group bonus game is the same as the single player game, and the critical data is stored locally at the slot machine.

SUMMARY

A system, apparatus, and method for preserving persistent bonus game state data for an asynchronous persistent group bonus game are discussed. The system may have a plurality of gaming machines configured to communicate with at least one network server through a network, which allows players to play the asynchronous persistent group bonus game. The asynchronous persistent group bonus game may last for any period of time and players can enter, pause and exit the bonus game asynchronously. Persistent bonus game state data such as player's game states and history, team's state and history, player relationships, player conversations, transactions between players or teams, assets collected, local game environments, global game state, game accounting data, and the like, may be modified and saved on one or more network servers, or alternatively on one or more slot machines in a peer-to-peer distributed storage manner. This allows the persistent bonus game state and other data to be recalled when needed, such as when a player plays another individual bonus game session in the asynchronous persistent group bonus game. The triggering events that cause the saving of the asynchronous persistent group bonus game data may be any change in the data themselves, the end of the bonus session for each player, or any other conditions depending on the game or jurisdictional requirements. When a player drops out of the asynchronous persistent group bonus game, or when the asynchronous persistent group bonus game terminates, any credits or items the player has collected may be converted and redeemed for monetary, non-monetary prizes, and/or roll over to equivalent features in another group game.

In a first embodiment, a system for preserving persistent bonus game state and other data for an asynchronous persistent group bonus game is described. The system includes a plurality of gaming machines associated with the asynchronous persistent group bonus game. Each of the plurality of gaming machines includes at least one processor, at least one input device, at least one display, and at least one local non-volatile memory. The local non-volatile memory may be configured to store a plurality of instructions and data. The at least one processor may execute the plurality of instructions to operate with the at least one display and the at least one input device. This enables a player to play a primary game of chance upon receipt of a wager. The system also includes at least one network server having at least one processor and at least one non-volatile memory. The at least one processor may be configured to communicate with each of the plurality of gaming machines via a network. The at least one network server may determine whether a bonus game session is triggered on any of the plurality of gaming machines. If a bonus game session is triggered, the at least one network server may cause the asynchronous persistent group bonus game to be displayed for any gaming machine that has triggered the bonus game session. The network server will also determine whether the player is a new player to the asynchronous persistent group bonus game, create new player record in the game database, modify the persistent bonus game state data when an event occurs in the asynchronous persistent group bonus game, and periodically save the persistent bonus game state data (representative of all individual players' progress) on the at least one non-volatile memory.

In another embodiment, a method for preserving persistent bonus game state and other data for an asynchronous persistent group bonus game on at least one network server configured to communicate with a plurality of gaming machines is described. The plurality of gaming machines may be configured to receive a wager from a player to play a primary game of chance. The method includes receiving a request to play the primary game of chance and determining if a bonus game session is triggered. The triggering of the bonus game session may cause persistent bonus game state data for an asynchronous persistent group bonus game to be recalled from at least one non-volatile memory on at least one network server. The at least one network server may receive an input to use at least one bonus game play asset in the asynchronous persistent group bonus game during the bonus game session, to track progress the player's progress, and to update the persistent bonus game state data on the at least one network server, and determine whether a bonus ending event has occurred to end the bonus game session for the player. When a bonus ending event has occurred for the player, at least one persistent bonus player data may be saved on the at least one non-volatile memory on the at least one network server.

In yet another embodiment, a method for preserving persistent bonus game state and other data for an asynchronous persistent group bonus game on at least one network server configured to communicate with a plurality of gaming machines is described. The plurality of gaming machines may be configured to receive a wager from a player to play a primary game of chance. The method includes operating an asynchronous persistent group bonus game from at least one network server upon receipt of a request from at least one of the plurality of gaming machines to play the asynchronous persistent group bonus game. The method further includes displaying the asynchronous persistent group bonus game on a display visible to the player or group of players, detecting an event in the asynchronous persistent group bonus game that modifies the persistent bonus game state and other data for an asynchronous persistent group bonus game, and periodically saving the persistent bonus game state and other data on at least one non-volatile memory stored on the at least one network server.

In yet another embodiment, a method for preserving the persistent bonus game state and other data for an asynchronous persistent group bonus game are collected and stored in a distributed manner on a peer-to-peer storage network. In a peer-to-peer storage network, data may be distributed among member nodes instead of concentrated on a server. Such a distributed storage system is highly available, scalable, has redundant capability, and thus can avoid the single-point-of-failure issue associated with a client/server network. The method further includes displaying the asynchronous persistent group bonus game on a display visible to the player or group of players, detecting events in the asynchronous persistent group bonus game that modifies the persistent bonus game state and other data for an asynchronous persistent group bonus game, and periodically saving the persistent bonus game state and other data on at least one non-volatile memory stored on the at least one slot machine in a peer-to-peer storage network.

The present invention provides other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

Figure 1:
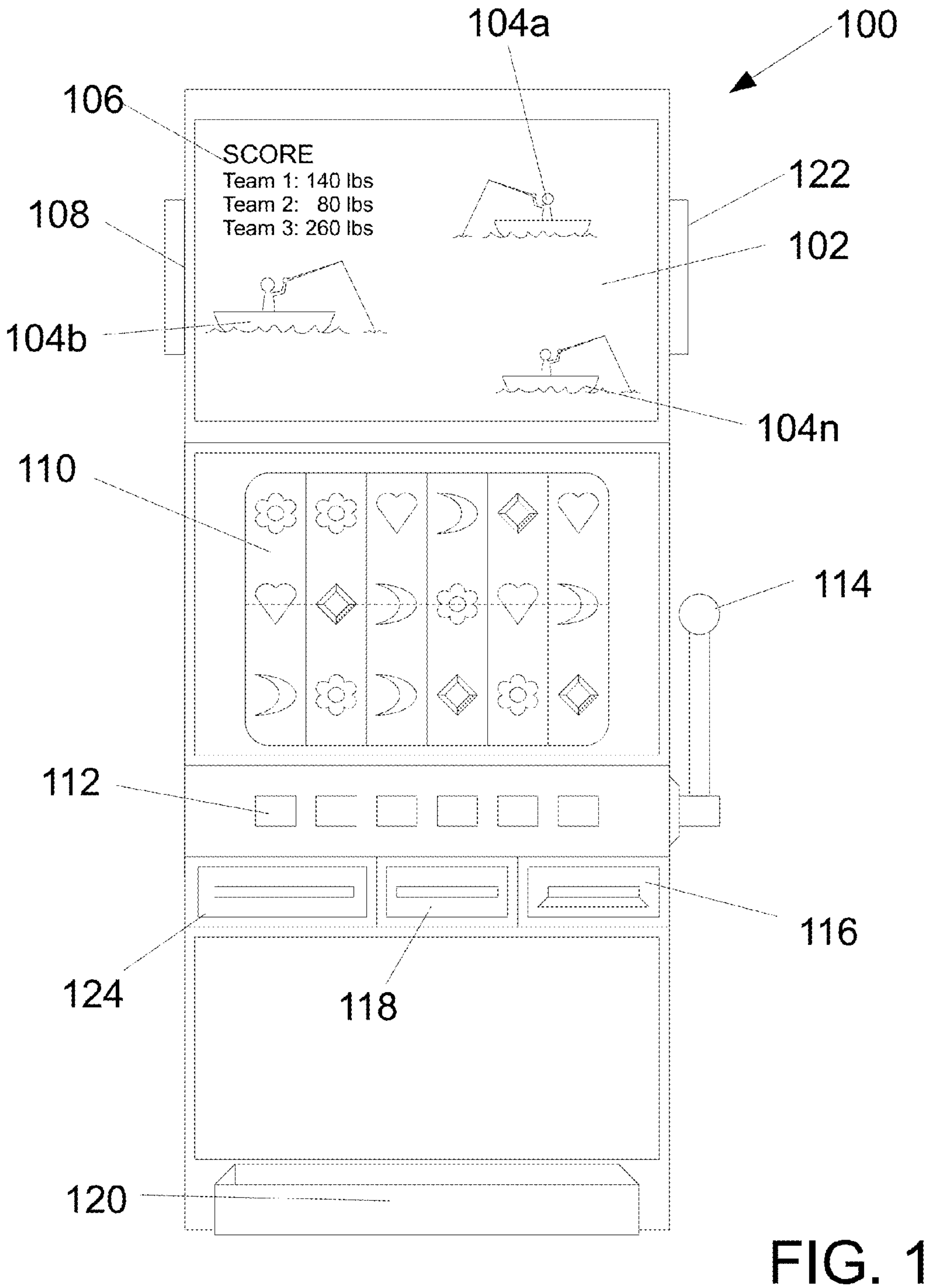
FIG. 1 illustrates a front view of an example gaming machine.

Embodiments are described herein in the context of preserving game state data for asynchronous persistent group bonus games. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

A system, apparatus, and method for preserving persistent bonus game state and other data (e.g. player account data) for an asynchronous persistent group bonus game are discussed. The system may have a plurality of gaming machines configured to communicate with at least one network server through a network, which allows players to play the asynchronous persistent group bonus game. The asynchronous persistent group bonus game may last for any period of time and players can enter and exit the bonus game asynchronously. Persistent bonus game state data (e.g. player's primary and bonus game states and history, team's states and history, player relationships, player conversations, transactions between players or teams, assets collected, local game environments, global game state, game accounting data, and the like) and other data may be modified and saved on the at least one network server when an event occurs in the asynchronous persistent group bonus game, allowing the persistent bonus game state and other data to be recalled when needed, such as when a player resumes play in the asynchronous persistent group bonus game. The triggering events that cause the saving of the data may be any change in the data themselves, or the end of the bonus session for each player, or other conditions depending on the game or jurisdictional requirements. When a player drops out of the asynchronous persistent group bonus game, or when the asynchronous persistent group bonus game normally terminates, any credits or items the player has collected may be converted and redeemed for monetary, non-monetary prizes, used as rollover credits to play a game on another gaming machine.

A gaming machine can be a fixed gaming machine such as a slot machine, an electronic table with multiple gaming stations, or a wireless mobile equivalent device such as a tablet computer or a smart phone. FIG. 1 illustrates a front view of an example gaming machine. A gaming machine 100 may have a main display 110. The main display 110 may display any type of primary game of chance upon receipt of a wager from a player. For example, the main display 110 may display reel-based slot games, video poker, video blackjack, lottery games, or any other type of known games of chance. In some embodiments, the main display may also display other types of text and graphics, including videos, pay tables, advertisements, secondary games, bonus games, player tracking information, announcements, or any other type of text and graphic.

The gaming machine 100 may have a player interface to play the primary game of chance. In the embodiment illustrated in FIG. 1, the player interface may be either buttons 112 or a lever 114. In other embodiments, the main display 110 may be the player interface. For example, the user interface may be a touch screen display configured to receive an input from the player. The player interface may be any type of input mechanism capable of allowing a player to select options, play the primary game of chance, play a bonus game, or enter any other player input. For example, pushing a button 112 or pulling a lever 114 may prompt the gaming machine 100 to begin a spin of a reel in a slot game to play a primary game of chance. In another example, a player may use the touch screen display to enter player account information. The gaming machine 100 may also have speakers 122, lights, or other output devices.

The gaming machine 100 may also have a TITO (Ticket In, Ticket Out) system. TITO uses tickets encoded with monetary amounts, which can be converted into credits to be played in the gaming machine 100 when inserted into the gaming machine 100. The gaming machine 100 may have a bill acceptor 116 configured to receive the tickets. The gaming machine 100 may also have a ticket printer 124 configured to print out similar tickets encoded with the amount of credits remaining on the gaming machine 100 when the player desires to no longer play the gaming machine 100 and cash out.

The bill acceptor 116 may also be configured to receive currency, for example paper bills. The gaming machine 100 may also have a mechanism to accept currency in other forms such as coins, vouchers, smart cards, electronic funds, and the like. The currency can then be converted into credits to be played on the gaming machine 100. The gaming machine 100 may have a credit dispenser 120 where the credits on the gaming machine 100 can be cashed out when the player desires to no longer play the gaming machine 100.

The gaming machine 100 may have a player tracking device 118 configured to receive a player loyalty card. Casinos may issue players a player loyalty card for player tracking and rewarding purposes. The player loyalty card may be associated with a player account. Player account data may be stored on a network server, which may be on a network database server configured to communicate with the gaming machines in the casino. The network may be a client-server network, a peer-to-peer network, a wired or wireless network, a wide area network (WAN), a local area network (LAN), or any other type of network. The player may insert his or her player loyalty card into the player tracking device 118 to log into the player's account, as further discussed below with reference to FIGS. 6A-6B. Data about the player's play, such as outcomes, bet amounts, time played, or any other type of information, may also be saved over the network to non-volatile memory at a player tracking server or any other network server.

The gaming machine 100 may have a secondary display 108 which may display information about an asynchronous persistent group bonus game separate from the primary game of chance. The asynchronous persistent group bonus game may be a bonus game triggered by an outcome in the primary game of chance, randomly triggered independent of the primary game, or by any other triggering event. The secondary display 108 may display bonus game environment 102 for the asynchronous persistent group bonus game. The secondary display 108 may also display bonus game information 106. The bonus game information 106 may be information such as scores, leader boards, rankings, team progress, statistics, messages, or any other information related to the asynchronous persistent group bonus game.

The bonus game environment 102 may have avatars 104*a*, 104*b*, 104*n* (where n is an integer). The avatars 104*a-n* may be graphical representations of each player or team that is participating in the group bonus game. For example, the avatars 104*a-n* may graphically depict characters, vehicles, boats or other images used to play the bonus game. In some embodiments, players may be allowed to select an avatar they wish to use in the bonus game environment 102.

In one embodiment, multiple players who each play a primary game of chance, on different gaming machines 100, may form a team and work toward an overall team goal in the asynchronous persistent group bonus game. Having an overall team goal may promote competition between teams and collaboration or camaraderie between team members, as team members strive to reach the overall team goal together. This may enhance the enjoyment of the players in playing the asynchronous persistent group bonus game, which may also increase the amounts the player decides to wager. It may also provide a social environment where friends can play with or against each other to augment their gaming experience.

In one embodiment, players may be prompted to create a new team, join an existing team, or be randomly assigned to a team. In another embodiment, a team may consist of only one player. Teams may or may not be competing with each other, depending on the game design. When not competing, team members collaborate together to achieve one or more common goals such as a total score, catching a predetermined pound of fish, or any other goals determined by the teams and/or game type. When competing, teams may be balanced such that competition between teams is fair. If the teams were not balanced, all players might choose to be a part of the same team and there would be no competition against another team. For example, if one team has only five members and another team has 20 members, the team with 20 members might have a better chance of accomplishing the overall team goal, which would decrease the enjoyment of players on the smaller team. Thus, a new player may be prompted to join the team with five members as opposed to the team with 20 members. By ensuring that teams have comparable numbers of members, players may feel that they have a more equal chance of attaining the overall group goal. In one embodiment, balancing the teams may be accomplished by allowing players to only join a team with the fewest number of members. In another embodiment, factors such as the level of experience a player has (e.g. rank), tools a player has access to, previous teams the player has played on, and the like make be used to balance the teams. More complex formulas with appropriate weights, statistics, and probabilities are assigned to each factor so that the aggregate team's capability is balanced to ensure a level playing field for all participating teams. Other methods to balance the teams are also possible depending on the design of the games and the associated rules.

In another embodiment, a player may prefer to play in the same group game environment, but not participate with a group or team. Thus, the group or team may be formed with 1 person and no load balancing required. The solo player keeps all the wins she is entitled to. However, the possibility of getting additional prizes when a group achieves a bonus is not available. Thus, a hybrid game environment where single players and teams can simultaneously participate can accommodate every player's preference, resulting in higher earnings for the game.

The asynchronous persistent group bonus game may last for a longer period of time than traditional bonus games. For example, the asynchronous persistent group bonus game may continue for several minutes, hours, weeks, months or in perpetuity as designed by the game developer and configured by the game operators. The asynchronous persistent group bonus game may be played asynchronously, i.e. players may not be playing with all of the other members of their team simultaneously. For example, player 1 104*a* may enter the bonus game environment 102 in the morning, but his friend (player 2 104*b*) may not enter the bonus game environment 102 until the evening, even though both may be on the same team. On another example, player 2 104*b* may enter the bonus game environment 102 while player 1 104*a* is already playing his bonus game session.

The asynchronous persistent group bonus game data may comprise the global game environment data, individual game player data, team data, player and team relationship data, historical data, and any other relevant data needed to maintain the integrity of the asynchronous persistent group game environment.

Asynchronous persistent group bonus game data can be partitioned into global and local game states since the asynchronous persistent group bonus game can take place at multiple casino locations, in different cities and states, with multiple sets of regulations. Global game data states are states that involve the overall world game environment such as the groups participating, their ID's, their locations, team members, team scores, team goals and progresses, prizes won, prizes remain, leaderboard information, global game time and calendar, time elapsed, game stage (start, on going, end), etc. Local game states concern with the local data associated with nearby players at the same casino, at the same game carousel, or even at the same virtual location (players grouped logically to be at the same virtual location, not physical location). Example of local asynchronous persistent group bonus game data are date and time of the local bonus game, game machine ID, player ID, player's tools accumulated, local viewport (versus global map) size and position, virtual location of participating player within the asynchronous persistent group bonus game world, absolute location of the gaming machine and the controlling jurisdiction, nearby activities (virtual or absolute), last known set of good data, etc. The global and local asynchronous persistent group bonus game data are used to maintain world and players/teams statuses, store players and teams progresses, keep track of game accountings, help with recalling of games to resolve a dispute, help a player review her recent or past activities, provide a method for disaster recovery of game data, etc.

In one embodiment, local asynchronous persistent group bonus data are collected and stored temporarily at a local server. Periodically, the data is pushed to a global asynchronous persistent group bonus game server to update the global game states. Similarly, global asynchronous persistent group bonus game data relevant to the local server is pulled from the global asynchronous persistent group bonus game server periodically to update local machines of changes (e.g. leaderboard information, jackpot status, prizes won, and the like). In between the data updates, the local server monitors, interacts, serves up data, save local game states, and generally controls the gaming machines assigned to it. Such a system architecture minimizes network activities generated by the myriads of micro-transactions that are not relevant to the global bonus game states such as when a player moves two yards in the West direction. It also allows the asynchronous persistent group bonus game to proceed locally even if communication is temporarily cut off from the global asynchronous persistent group bonus game server.

In another embodiment, global and local asynchronous persistent group bonus data are stored at a central server. Although this generates more data traffic on the network, such an architecture is easy to maintain and all participating games are assured to have the most updated game states. This is advantageous for certain game types such as real-time car races.

In another embodiment, global and local asynchronous persistent group bonus data are stored in a hybrid peer-to-peer distributed file storage system. With this approach, each machine (node) can act as a client requesting data or a server sending data to a requesting machine. Additionally, designated machines (nodes) can be equipped with software to be both a global asynchronous persistent group bonus data server and a local asynchronous persistent group bonus data server. Other machines (nodes) stores primarily local asynchronous persistent group bonus data, and periodically pushes the local data to the designated global/local asynchronous persistent bonus group data nodes and pulls global asynchronous persistent bonus group data from the designated nodes as needed. As each designated global/local asynchronous persistent group bonus data server node may receive different updates from nearby nodes, the designated global/local nodes periodically communicate with each other separately at the application level to keep their databases in synchronization with each other. Such a hybrid peer-to-peer distributed storage architecture provides data to other nodes in a fast, resilient, scalable, load balanced, and asynchronous persistent manner. For instance, a network of fixed gaming machines configured in this manner can scale up, on demand, to include new mobile gaming terminals such as the mobile smart phones. The distributed file storage approach also keeps the costs low while minimizing communication bandwidth across the network.

Figure 2A:
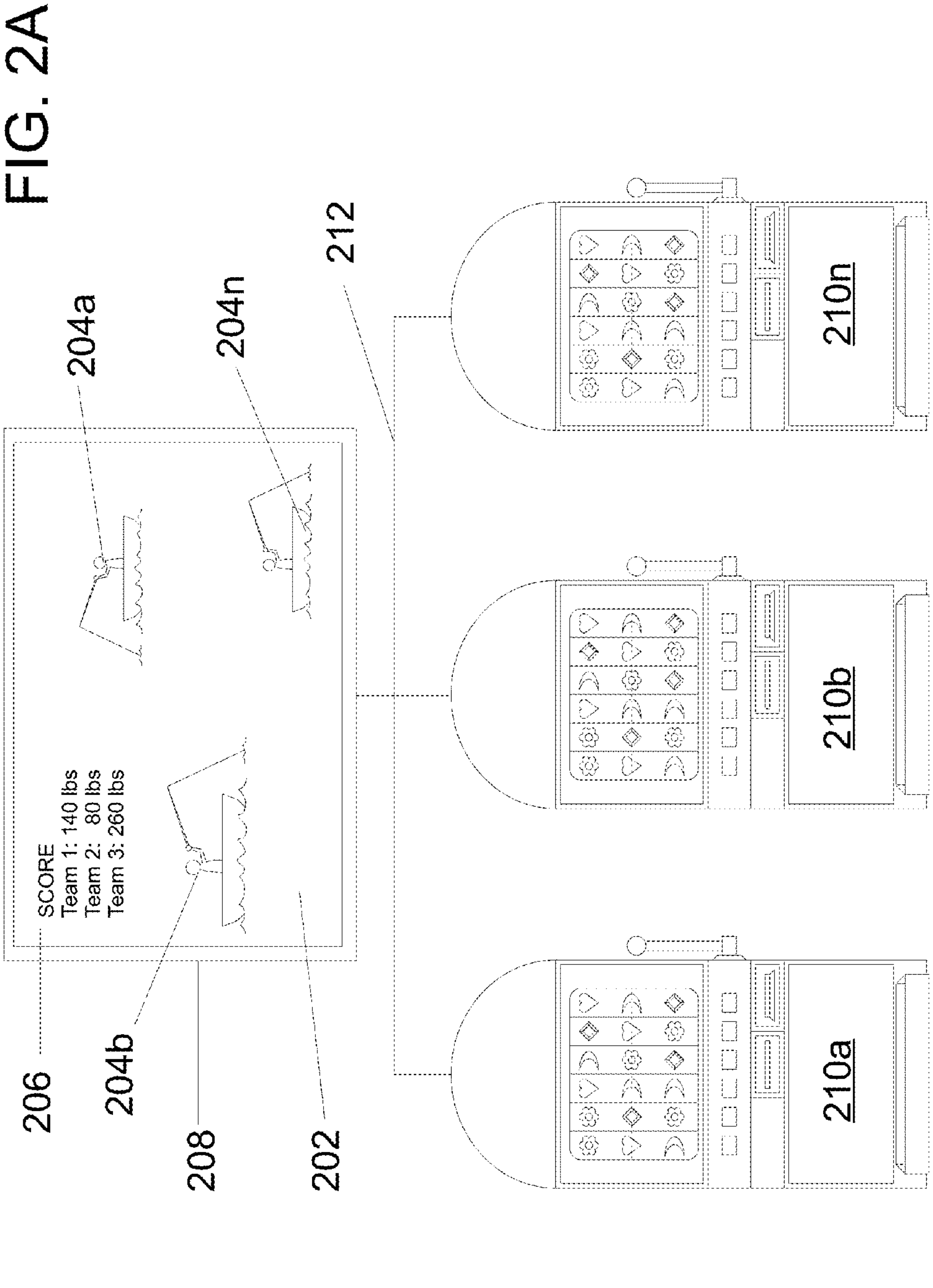
FIGS. 2A-2C illustrate the asynchronous persistent group bonus game displayed on a community display.
Figure 2B:
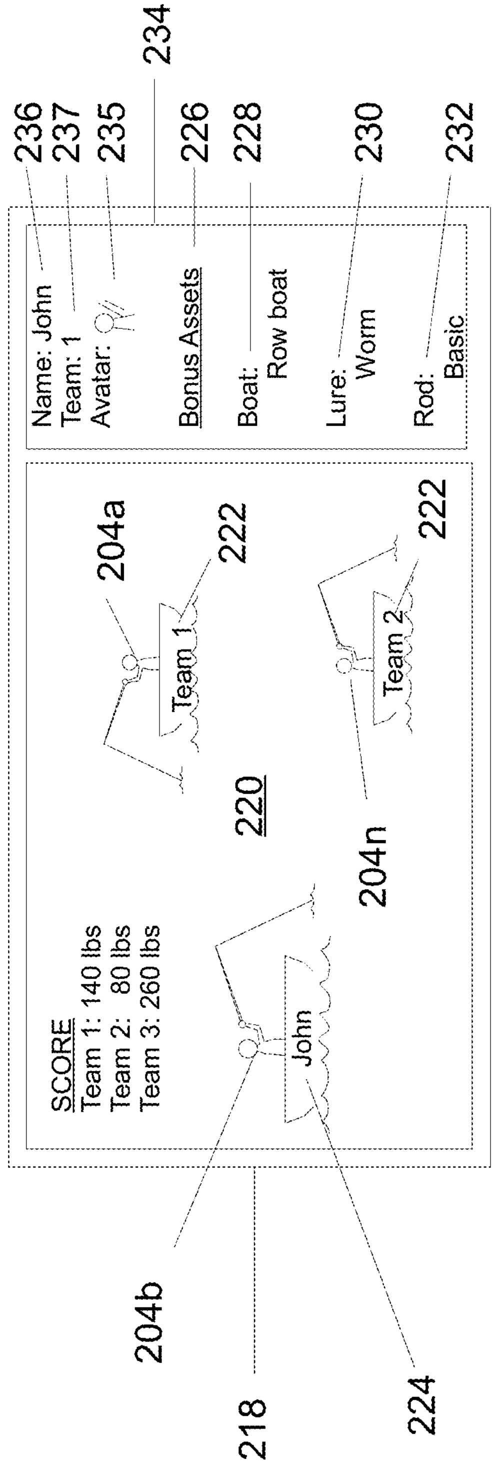
Figure 2C:
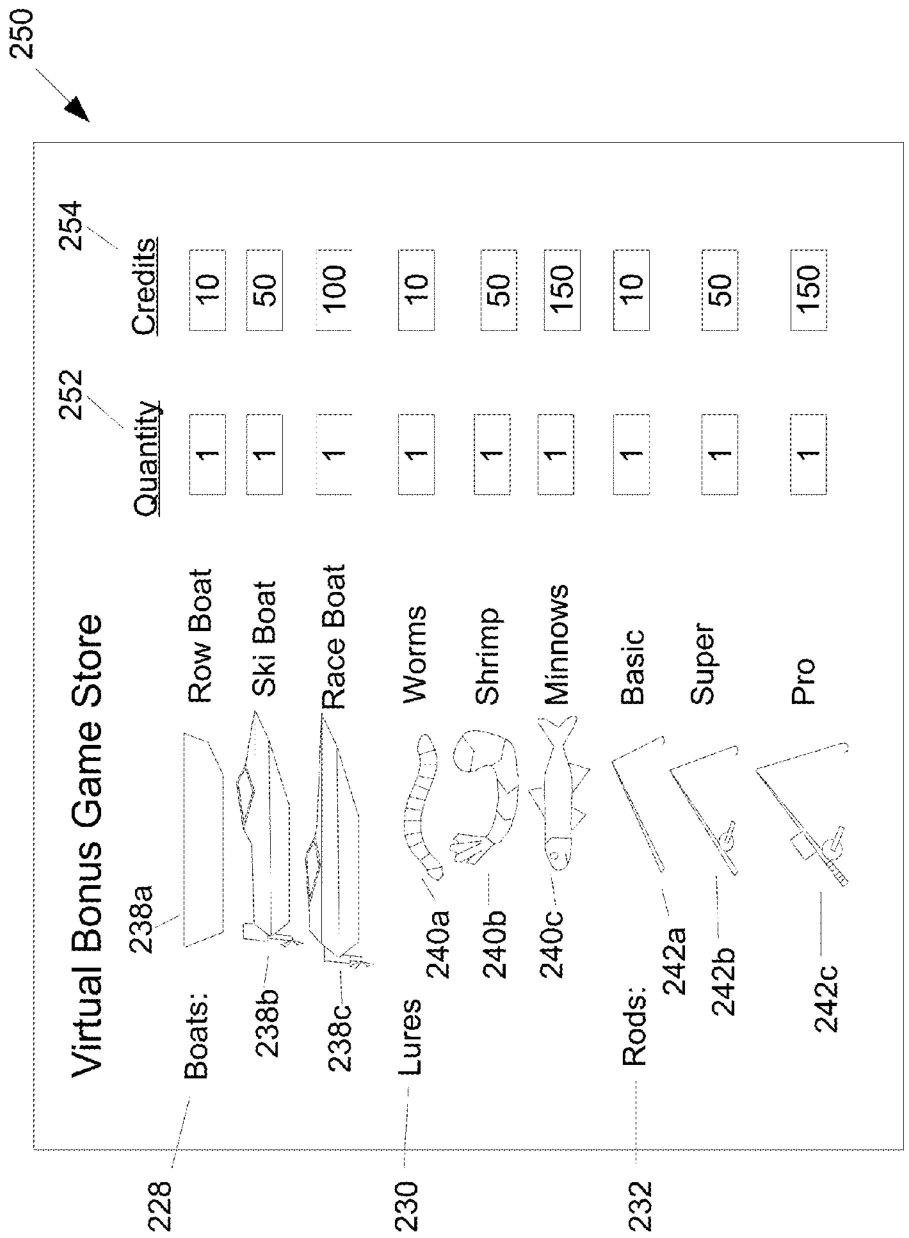

FIGS. 2A-2C illustrate the asynchronous persistent group bonus game displayed on a community display. Referring to FIG. 2A, a plurality of gaming machines 210*a-n* may be configured to communicate with a community display 208 via network 212. The network 212 may be a client-server network, a peer-to-peer network, a wired or wireless network, a WAN, a LAN, or any other type of network. Each of the plurality of gaming machines 210*a-n* may be generally similar to the gaming machine 100 shown in FIG. 1. However, in the embodiment shown in FIG. 2, there may be a community display 208 visible to all players of each of the plurality of gaming machines 210*a-n* instead of each of the plurality of gaming machines 210*a-n* having its own individual secondary display 108 as illustrated in FIG. 1. However, this is not intended to be limiting as each of the plurality of gaming machines 210*a-n* may also have a secondary display to display the asynchronous persistent group bonus game.

The community secondary display 208 may display the bonus game environment 202 for the asynchronous persistent group bonus game. The bonus game environment 202 may have avatars 204*a-n* individual players may use to play the asynchronous persistent group bonus game. In the embodiment illustrated in FIG. 2A, the avatars 204*a-n* appear as boats with fishermen. However, the avatars 204*a-n* may be any design or have any characteristics as determined by the type of asynchronous persistent group bonus game. The community display 208 may also display bonus game information 206. The bonus game information 206 may be information such as scores, leader boards, rankings, team progress, statistics, messages, or any other information related to the asynchronous persistent group bonus game.

EXAMPLE 1

Once a bonus game session is triggered on the gaming machine 100, the asynchronous persistent group bonus game begins and may be displayed on the secondary display 108 (FIG. 1) and/or on the community display 218 as illustrated in FIG. 2B. For exemplary purposes only and not intended to be limiting, an example asynchronous persistent group bonus game will be described. Although described with reference to a fishing-type bonus game, this is not intended to be limiting as any type of game may be developed for the asynchronous persistent group bonus game.

The asynchronous persistent group bonus game may be a fishing game where the bonus game environment may be a pond 220 and the avatars 204*a-n* may be fishermen. Each player may have bonus assets 226 to use when playing the bonus game. Such assets may be displayed on a first portion 234 of the community display 218 or on the secondary display 108 (FIG. 1). Such assets may be a boat 228, hooks or lures 230, fishing rod 232, or any other items to assist a player or team in catching more fish in the asynchronous persistent group bonus game. The bonus game play assets may be acquired from a player's play in the primary game of chance, obtained while playing the asynchronous persistent group bonus game, or bought with credit at a virtual bonus game store. A virtual bonus game store is an online store where players can buy, sell, or trade their virtual assets. The virtual bonus game store may be uniquely designed as a part of an asynchronous persistent group bonus game or be a generic application that associates with multiple asynchronous persistent group bonus games. In one embodiment, the virtual bonus game store may be implemented as a software application with its associated database operating on a server connected to the network and accessible by participating players. The first portion 234 may also provide the name of the player 236, the team 237 the player is on, the avatar 235 for the player, and any other information. As illustrated, John 236 may have a row boat 228, worm lures 230, and a basic fishing rod 232.

Each avatar 204*a-n* may be labeled by team 222 and/or the player's name 224. However, this is not intended to be limiting as each player may be identified by any other means, such as the color of the avatar, use of other identifiers, such as flags, and the like. Furthermore, the bonus game environment and the avatars 204*a-n* can have any design or any characteristics as needed for a player to play the asynchronous persistent group bonus game.

FIG. 2C illustrates example bonus assets that may be used to play the bonus game. As stated above, the bonus game play assets may be bought with credit at a virtual bonus game store or may be earned via playing the primary game. The store 250 may provide different types of assets that a player may use to play the bonus game. For this example, the store may sell a variety of boats 228, lures 230, and fishing rods 232.

The player may select from a row boat 238*a*, ski boat 238*b*, or a racing boat 238*c*. Each boat may allow the player the move around the pond faster to provide a better chance of catching fish. The player may also select to use a worm 240*a*, shrimp 240*b*, or a minnow 240*c* as a lure. For a fishing rod, the player may elect to use the basic fishing rod 242*a*, the super rod 242*b*, or the professional rod 242*c*. The type of lure and/or fishing rod selected may determine the type and/or weight of fish caught as well as the speed at which the player catches the fish. By using superior tools or having better or more experience than other participating players, the player may have a better probability that a winning random number is drawn. For instance, the player may be assigned a number ranging between 1-5 when a random number is drawn between 1-100 by a random number generator, compared to other less experienced players who may be assigned a number ranging between 1-3.

In one embodiment, for each asset, the player may elect to choose the quantity 252 desired. Additionally, the amount of credits 254 required to obtain each asset may be displayed.

As the asynchronous persistent group bonus game is played, events may occur that can change the state of the bonus game environment 102. Each player may move their fishermen avatar around the pond 220 and attempt to catch fish using bonus game play assets 226. For example, fish might be caught while playing in the bonus game environment 102, boats might be moved around the pond to different locations, a player may have entered the pondor left the pond, a team may have completed its objective, scores and game statistics may be updated, or any other gaming related events. As these events occur, the new state of the bonus game environment 102 may be saved to the network server, a local server, a slot machine, or any combination of these. The asynchronous persistent group bonus game displays are updated so that new players coming into the bonus game environment 102 will see the current state of the asynchronous persistent group bonus game displayed and begin their new bonus game session in the current state of the bonus game environment 102. While the network server may usually be a bonus server, a player tracking server or any other local or network server may also be used.

The asynchronous persistent group bonus game may terminate at any predefined event, such as at a certain time (i.e., one week tournament), a certain event (i.e., top 10 teams completed their objectives or goals), or the asynchronous persistent group bonus game may continue perpetually, depending on the design of the game.

Throughout the asynchronous persistent group bonus game, the global game environment can be saved so that entering players will be in the most current state of the asynchronous persistent group bonus game. Some example of global environment data that may be saved periodically (the saving may occur based upon a time snap shot, an event(s), or both) are: 1) game time stamp; 2) rules in effect at the actual (physical) casino; 3) active player identification (ID) and/or active team's ID; 4) global map of players, their virtual locations, and their activities; 5) active rules set for the virtual location and time; 6) current scores and prizes accumulated by each player and their composite teams; 7) game state (e.g. start, end, paused, running); 8) indication of the status of the leaders, individuals and/or teams; 9) prize distribution parameters (i.e., where, how much, what it takes to reveal a prize); 10) relationships between teams (friendly, hostile, indifference); or nay other global game environment data.

In addition to the global game state data, the micro state data of each player can also be saved or stored. Each player can have an account recorded in the asynchronous persistent group bonus game database, as well as the player's historical activities such as time, date, location, cumulated amount of time spent in the asynchronous persistent group bonus game, prizes won, current score, assets/tools remained, participation state (e.g. enter, exit, pause, drop out, and the like), and the like.

In another embodiment, an asynchronous persistent group bonus game may have an overall team goal each team is to achieve. For example, the team goal might be to catch a certain amount of fish, such as 300 pounds of fish. Each team would complete to be the first team to catch 300 pounds of fish. This is only one example of an overall team goal, as the overall team goal can vary depending on the characteristics of the asynchronous persistent group bonus game. The first team to complete the overall team goal would win the asynchronous persistent group bonus game, and an overall prize can be distributed among all the members of the winning team. In addition to the overall prize, each player may also win an individual prize(s) based on the amount of fish the player caught.

Within the asynchronous persistent group bonus game environment, multiple tournaments, that are independent of each other, may occur concurrently. Thus, the termination of one local fishing tournament between five local teams does not terminate all the other parallel tournaments. The global game termination is often set by the casino operators or game designers to take place at a pre-defined or certain time, when large prizes have been exhausted, when the progressive prizes have been won, or any other criteria.

The player's activities in the asynchronous persistent group bonus game during the bonus game session may be applied towards the overall progress of the player's team in reaching the overall team goal of the asynchronous persistent group bonus game. The player's individual bonus gaming session may end prior to the termination of the asynchronous persistent group bonus game such that the player may play several individual bonus gaming sessions in the asynchronous persistent group bonus game before the asynchronous persistent group bonus game terminates. Additionally, the player may enter and exit the asynchronous persistent group bonus game independent of and without regard to whether other players are playing or exiting or entering the asynchronous persistent group bonus game.

The asynchronous persistent group bonus game may continue to run until an overall team goal is reached by one or more of the teams, regardless of the number of players playing the asynchronous persistent group bonus game at any one time. In another embodiment, the asynchronous persistent group bonus game may continue to run until a timer has expired, or some other ending condition or event has occurred.

Figure 3:
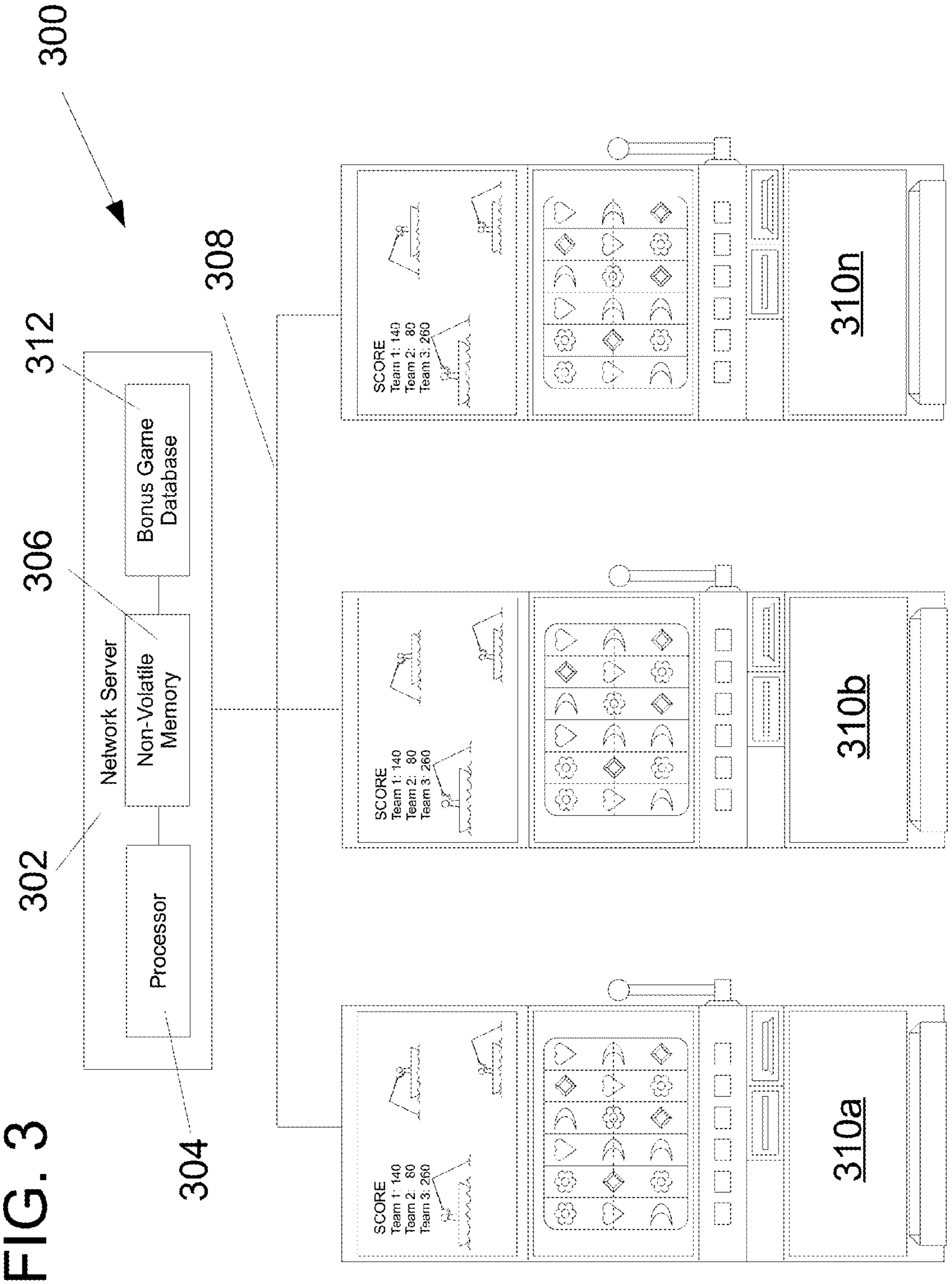
FIG. 3 illustrates an embodiment of a group gaming system.
Figure 5:
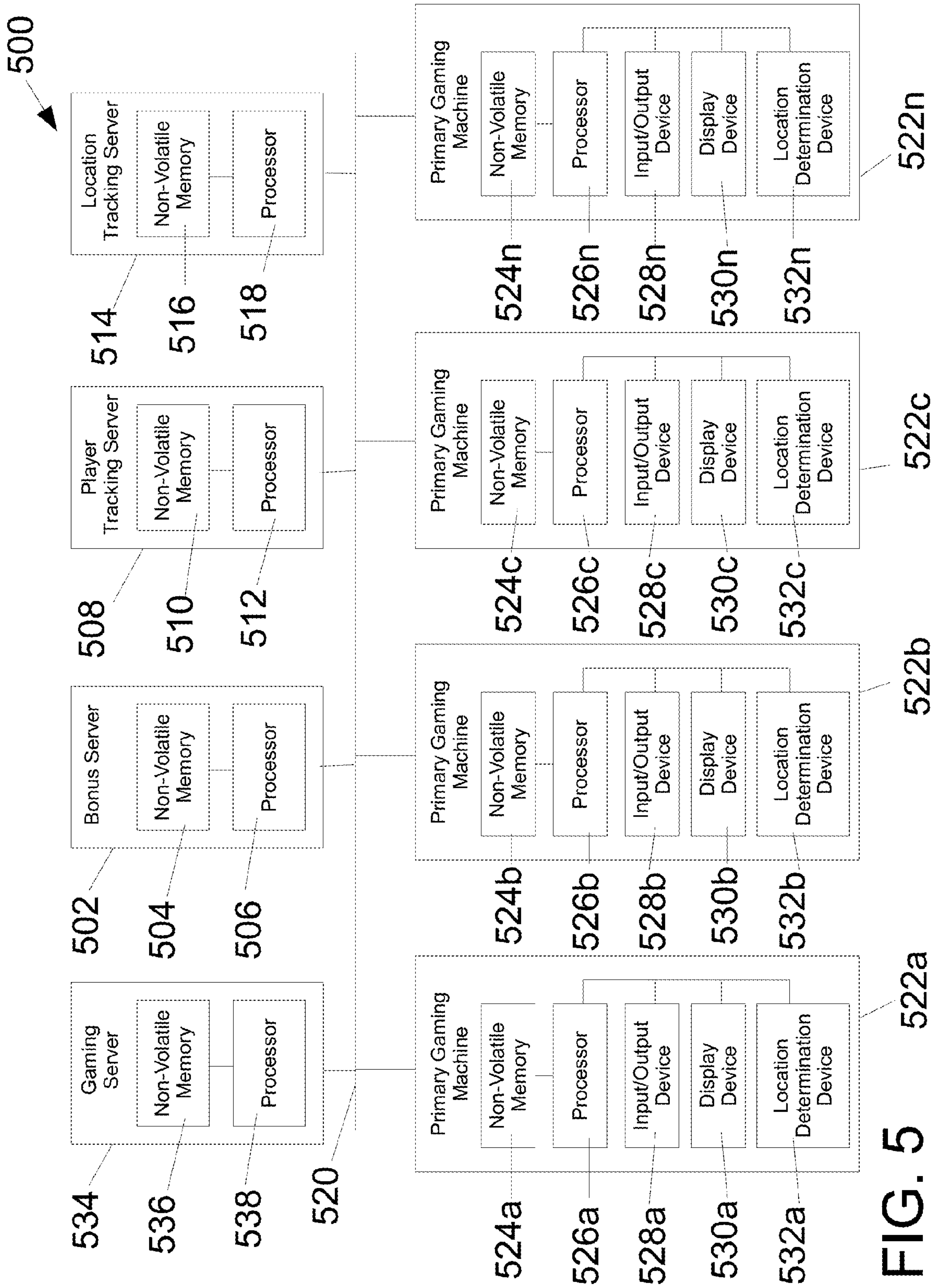
FIG. 5 illustrates yet another embodiment of a group gaming system for playing an asynchronous persistent group bonus game.

FIG. 3 illustrates an embodiment of a multi-player system. A networked multi-player system 300 may have a plurality of gaming machines 310*a-n* configured to communicate with at least one network server 302 via a network 308. The network 308 may be a client-server network, a peer-to-peer network, a wired or wireless network, a WAN, a LAN, or any other type of network. Each of the plurality of gaming machines 310*a-n* may be similar to the gaming machine 100 illustrated in FIG. 1. However, other embodiments are possible, including the use of a community display, as illustrated in FIG. 2A. Other devices such as a gaming server, a player tracking server, a bonus server, a location tracking server, or any other type of device, may be configured to communicate via the network 308, as illustrated in FIG. 5.

Each of the at least one network servers 302 in the networked multi-player system 300 illustrated in FIG. 3 may have a processor 304. Each of the at least one network servers 302 may also have a non-volatile memory 306 configured to communicate with the processor 304. The non-volatile memory 306 may store data that can be transmitted over the network 308 from the at least one network server 302 to any other devices via the network 308. The non-volatile memory 306 may be non-volatile random access memory (NV-RAM), ferromagnetic hard disk drive, optical disk drive, magnetoresistive random access memory (MRAM), flash memory, or any other type of data storage solution that will not lose stored data or data loaded into memory in the event of a power loss or malfunction.

The non-volatile memory 306 at the network server 302 may store various types of game state data to allow asynchonicity and the persistence nature of the game over a period of time. Saving game state data on the network server 302 may allow the casino to restore either a primary game of chance or an asynchronous persistent group bonus game to the state it was in prior to a power loss or malfunction. For example, if a player is playing a video poker game when the power goes out, the casino can resume the video poker game in the exact state it was in immediately prior to the loss of power, with the same cards displayed, the same amount of credits in the player's account, and the same wagered amount. The player can then continue his game as if the power loss never happened. The network server 302 may also store prior versions of the game state data for a predetermined period of time to assist in verification of previous game outcomes. For example, if a player claims that he or she won a prize on a gaming machine but was not awarded his or her credits, the casino may be able to review the game state data from the network server 302 and confirm or disprove the player's claim. Additionally, game state data may need to be saved and retained for a predetermined period of time to comply with certain local regulations that casinos and other gaming operators must follow. Furthermore, saving game state data allows a player to enter an asynchronous persistent group bonus game at its current game state, as discussed above in Example 1.

Game state data stored for these purposes may include several different components, such as primary player data, persistent bonus player data, persistent bonus group data, and persistent bonus world data. The primary player data may include information and statistics about a player's play of a primary game of chance. For example, player tracking data about the type of games the player likes to play, denomination amount, time between plays, and any other player tracking and/or account data may be stored as part of primary player data.

Another component of the game state data that may be saved may be persistent bonus player data. Persistent bonus player data may be information about each player's play in the asynchronous persistent group bonus game as well as the relationship (e.g. friends, foes, acquaintances of the player with others inside or outside of the team, and the like). Referring back to Example 1, such information might include the amount of fish caught, the bonus game play assets acquired and used, the last location of the player's boat, or any other data or statistic about the player's play in the asynchronous persistent group bonus game.

The persistent bonus player data may be saved in a bonus game database 312. The persistent bonus player data may be recalled from the bonus game database, for example, when the player triggers another bonus game session while playing the primary game of chance. This allows the player to start the bonus game session with all of the bonus game play assets and/or data from the last previously saved bonus game session in the asynchronous persistent group bonus game.

Another component of the game state data that is saved may be persistent bonus group data. Persistent bonus group data may include data about the current state of at least one group of players on a team. For example, players may join together to form teams to play toward an overall group goal. In another example, groups may challenge one another in a tournament environment. In one embodiment, the persistent bonus group data may include a roster of the team members on the team, the team's progress toward the overall group goal, the amount of time that the team has been playing the asynchronous persistent group bonus game, and any other information that is desired to be saved about the team.

Interspersed among teams may be individual players (e.g. a team or group having 1 player) who chose not to join any team, but still want to participate and possibly win the grand prize without having to share or split the winnings with other players.

Another component of the game state data that may be saved on the network server 302 may be persistent bonus world data. The persistent bonus world data may include information about the asynchronous persistent group bonus game environment. For example, in Example 1 discussed above, the persistent bonus world data may be information about the location of fish, the overall team scores, start time, end time, pay tables, probabilities of catching fish in certain locations on the pond, total prizes already paid out, and any other information that is desired to be saved about the overall asynchronous persistent group bonus game environment.

Figure 4:
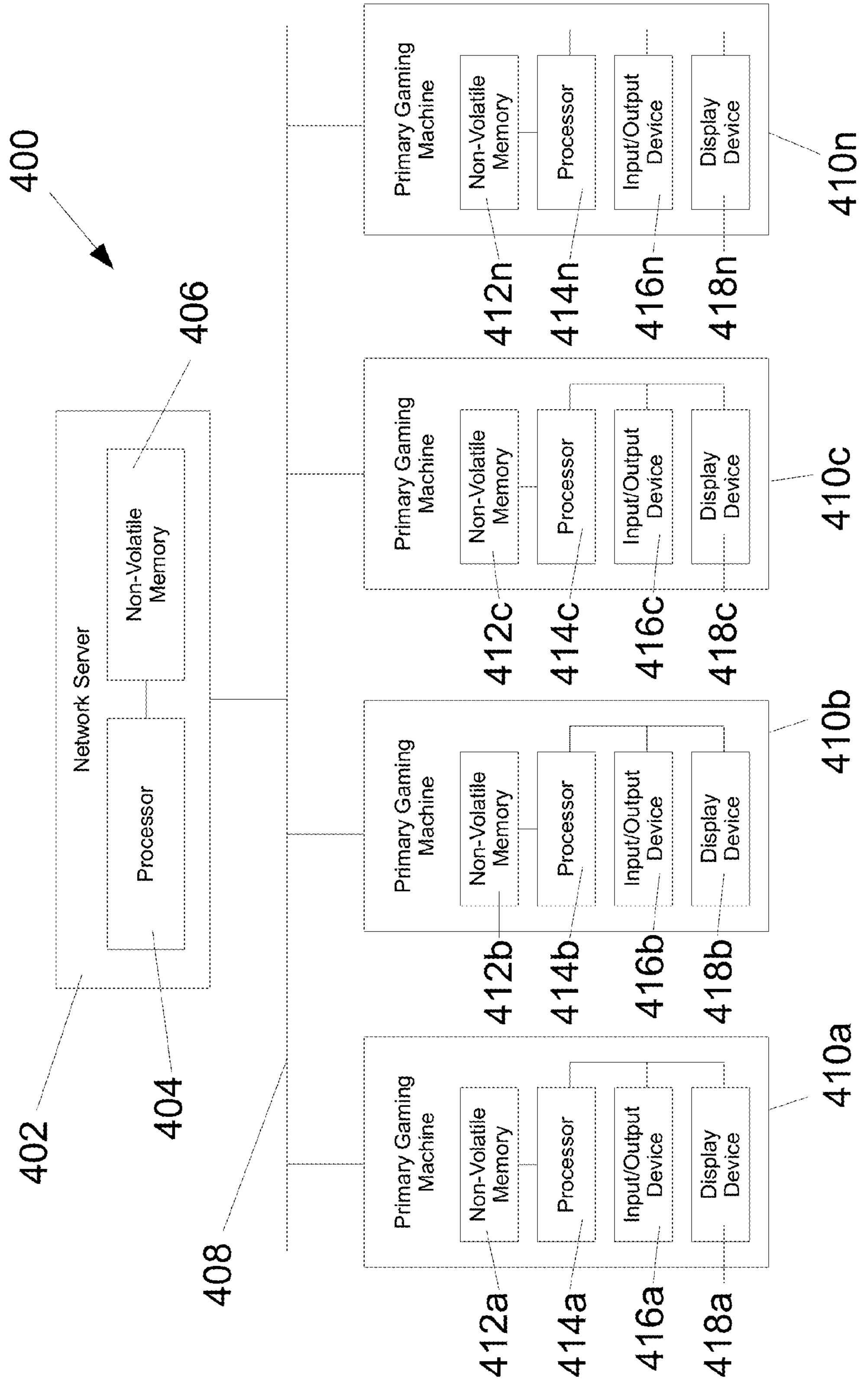
FIG. 4 illustrates another embodiment of the group gaming system for playing an asynchronous persistent group bonus game.

FIG. 4 illustrates another embodiment of the multi-player system for playing an asynchronous persistent group bonus game. The system may have a plurality of gaming machines 410*a-n* configured to communicate with at least one network server 402 through a network 408. The network 408 may be a client-server network, a peer-to-peer network, a wired or wireless network, a WAN, a LAN, or any other type of network. The network server 402 may have a processor 404 configured to communicate with a non-volatile memory 406.

A plurality of gaming machines 410*a-n* may be configured to communicate with the network server 402 via the network 408. Each of the plurality of gaming machines 410*a-n* may have a local non-volatile memory 412*a-n* configured to communicate with a processor 414*a-n*. The processor 414*a-n* may also be configured to communicate with at least one input/output device 416*a-n* and at least one display device 418*a-n*.

The local non-volatile memory 412*a-n* may store data related to the primary game of chance played on the respective gaming machine 410*a-n*, such as object code, game history, pay tables, local game states, global game states and any other gaming data. In one embodiment, a decentralized peer-to-peer storage environment may be used to store data. Each gaming node in the decentralized peer-to-peer storage environment may be configured to store at least a portion of the total asynchronous persistent group bonus game environment data. The peer-to-peer distributed storage system can have a self-organizing characteristic as storage nodes can come and go and the peer-to-peer storage network adapts accordingly. In an asynchronous persistent group bonus game environment, the robustness of a distributed storage system is a viable implementation that will allow players to continue to play even if a network disruption occurred. Various known look-up algorithms can be implemented to allow data to be retrieved by any node regardless of where the data were stored. The technical paper "*A Survey of Peer to Peer Storage Techniques for Distributed File Systems*" by the Department of Computer Science of the University of Illinois, Urbana Champaign, which is incorporate herein by reference in its entirety for all purposes, discussed these methods in details. The processor 414*a-n* may use software or may be programmed to run the operation of each of the plurality of gaming machines 410*a-n*, including operation of the primary game of chance.

The at least one input/output device 416*a-n* may be any device that can accept commands from a player (input device) or provides feedback to the player (output device). For example, the buttons 112, the microphone (not shown), and the lever 114 (FIG. 1) may be input devices. Examples of output devices may include the display 110 (FIG. 1), speakers 122 (FIG. 1) or lights connected to each of the plurality of gaming machines 410*a-n*. The at least one display device 418*a-n* may be a screen or other mechanism for displaying the primary game of chance. The main display 110 or secondary display 108 illustrated in FIG. 1 is an example of the at least one display device 418*a-n*.

FIG. 5 illustrates yet another embodiment of a multi-player system for playing an asynchronous persistent group bonus game. The multi-player system 500 may have a gaming server 534, a bonus server 502, a player tracking server 508, and a location tracking server 514. Although only illustrated with four example servers, the number and type of server is not intended to be limiting as any number and type of server may be used as desired. The gaming server 534, the bonus server 502, the player tracking server 508, and the location tracking server 514 may be configured to communicate via a network 520 with each other and with each of a plurality of gaming machines 522*a-n*. The network 520 may be a client-server network, a peer-to-peer network, a wired or wireless network, a WAN, a LAN, or any other type of network.

Each of the plurality of gaming machines 522*a-n* may have a processor 526*a-n*. Each of the plurality of gaming machines 522*a-n* may also have a local non-volatile memory 524*a-n* configured to communicate with the processor 526*a-n*. Each of the plurality of gaming machines 522*a-n* may also have an input/output device 528*a-n* and/or a display device 530*a-n* configured to communicate with the processor 526*a-n*. A locator device or location determination device 532*a-n* may also be configured to communicate with the processor 526*a-n*. The locator device 532*a-n* may determine the general physical geographic location of the casino, or the specific location on the casino floor of each of the plurality of gaming machines 522*a-n*. Location information can be used to enforce local jurisdictional requirements (e.g., minimum payout percentage, bet size, and the like), or to modify the asynchronous persistent group bonus game (e.g., game rules, localization features for the city, the casino brands, prizes, and the like). In one embodiment, a Global Positioning System (GPS), a cellular towers triangulation or trilateration system, a WiMax triangulation or trilateration system, a WiFi triangulation or trilateration system, or some combination of these triangulation and trilateration system may be used. In another embodiment, IP address analysis may be used. In still other embodiments, the location determination device 532*a-n* may use any known method, system, or device to determine the physical location of each of the plurality of gaming machines 522*a-n* (some of which may also be gaming machinemobile devices such as smart phones), such as a nearby access point, signal strength analysis, time difference of arrival, or other RF location methods.

The gaming server 534 may store data or information related to the primary game of chance. For example, the gaming server 534 may store the object code for running a primary game of chance on a gaming machine. The gaming server 534 may have a processor 538 and a memory 536 configured to communicate with the processor 538. The memory 536 may be any type of memory, but is illustrated as a non-volatile memory. The processor 538 on the gaming server 534 may be configured to run the operation of the primary game of chance. The processor 538 may receive requests and/or commands from any of the plurality of gaming machines 522*a-n*, execute such requests or commands, and save game state data on the non-volatile memory 536. The gaming server 534 may also be configured to download a plurality of primary games to any of the plurality of gaming machines 522*a-n* via network 520. This may allow a player to choose from a variety of primary games of chance to be played on each of the plurality of gaming machines 522*a-n*.

The bonus server 502 may execute and store data or information related to the asynchronous persistent group bonus game. In one embodiment, the bonus server 502 may be configured to store game state data specific to the asynchronous persistent group bonus game. Such game state data may include persistent bonus player data, persistent bonus group data, and/or persistent bonus world data. The bonus server 502 may have a processor 506 configured to communicate with a memory 504. The memory 504 may be any type of memory, although illustrated as a non-volatile memory. The processor 506 on the bonus server 502 may be configured to run the operation of the asynchronous persistent group bonus game. The processor 506 may receive requests and/or commands from any of the plurality of gaming machines 522*a-n*, update the bonus gaming environment 102 based on the commands, and save or update game state data on the non-volatile memory 504 and any active local or global environment displays.

The player tracking server 508 may store data or information related to player accounts. In one embodiment, the player tracking server 508 may be specialized to store data about each individual player's play in a primary game of chance and/or the asynchronous persistent group bonus game. The player tracking server 508 may have a processor 512 configured to communicate with a memory 510. The memory 510 may be any type of memory, although illustrated as a non-volatile memory. The player tracking server 508 may identify individual players when players insert their player loyalty cards into a gaming machine, such as through the use of a player tracking device 118 (FIG. 1). After inserting the player loyalty card, the player tracking server 508 may access and store information or data about the player in the memory 510, track statistics about the player's play, such as the type of game, amount of money wagered, or any other statistics.

In one embodiment, a location tracking server 514 may be used to determine the location of each of the gaming machines 522*a-n*. A game's characteristic may varied due to its location. The location tracking server 514 may be used in addition to the location determination device 532*a-n* in each of the gaming machines 522*a-n* or may be used if there is no location determination device 532*a-n* in the gaming machines 522*a-n*. Once the location of each of the gaming machines 522*a-n* is determined, the information may be transmitted via the network 520 to the gaming server 534 and/or the bonus server 502. The gaming server 534 and/or the bonus server 502 may then configure the primary game of chance and/or the asynchronous persistent group bonus game to comply with rules, laws, or regulations of local government jurisdictions, local game rules created by the casino operator, themes created by the game designer, localization features associated with the city, casino brands, and the like, based upon the location of each of the gaming machines 522*a-n*.

The location tracking server 514 may have a processor 518 configured to communicate with a memory 516. The memory 516 may be any type of memory, although illustrated as a non-volatile memory. The physical location of each of the plurality of gaming machines 522*a-n* may be stored in the memory 516 at the location tracking server 514.

Figure 6A:
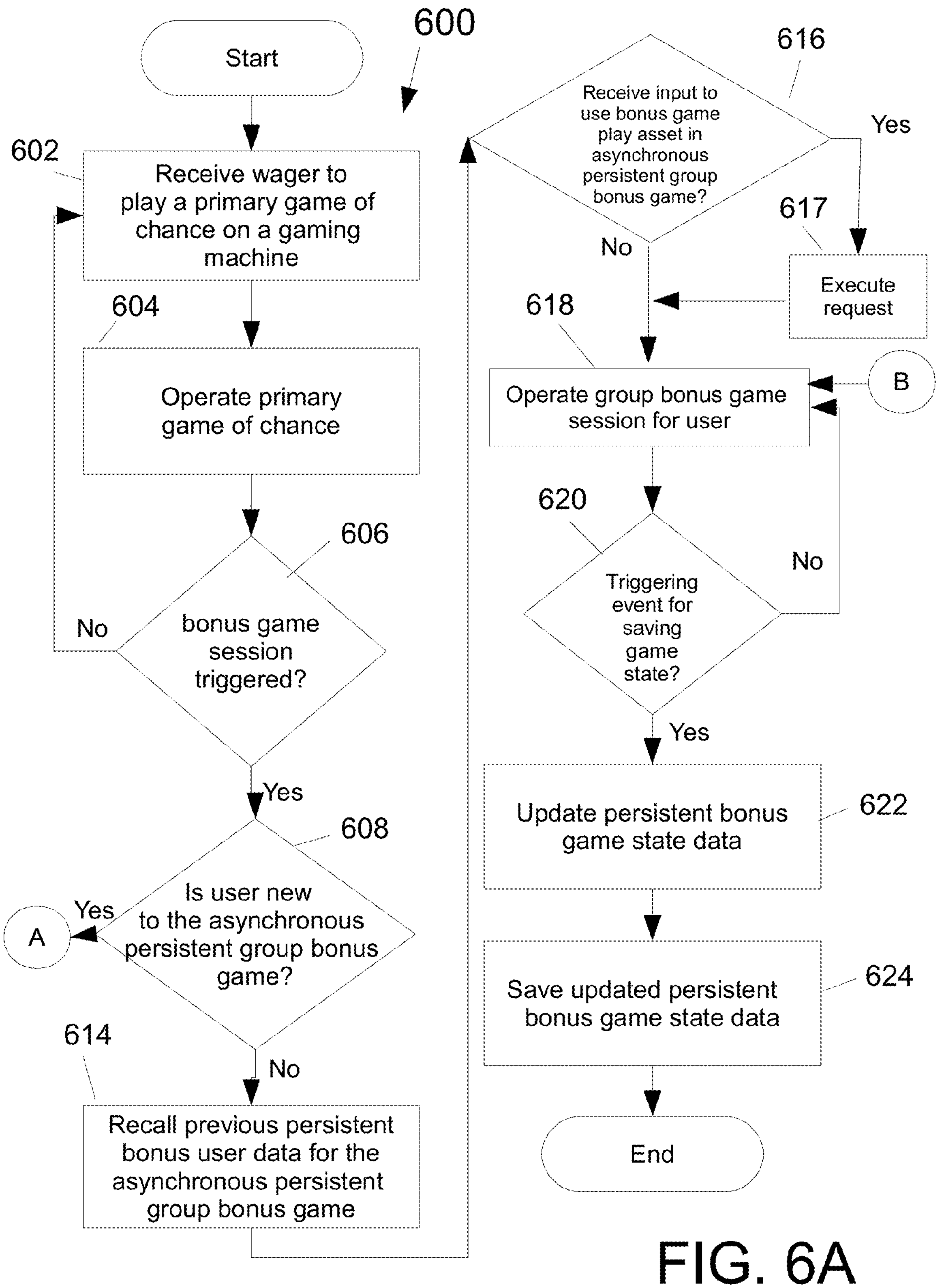
FIGS. 6A and 6B are flow charts illustrating an example method to play an asynchronous persistent group bonus game.
Figure 6B:
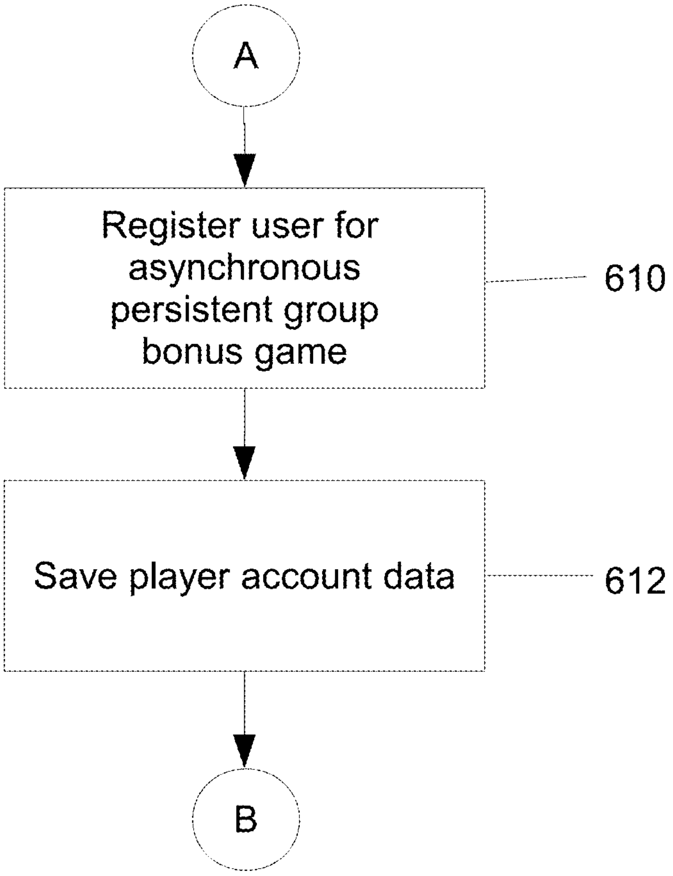

FIGS. 6A and 6B are flow charts illustrating an example method to play an asynchronous persistent group bonus game. Referring to FIG. 6A, the method 600 starts with a wager received on a gaming machine to play a primary game of chance at 602. The primary game of chance is then operated at 604 on the gaming machine. A determination is then made as to whether a bonus game session is triggered at 606. A bonus game session can be triggered for the player randomly, when a certain symbol or combination is generated on the main display of the gaming machine during the player's play of the primary game of chance, or when other predetermined criteria are met.

A bonus game session may be a bonus game played by a player in the asynchronous persistent group bonus game. In one embodiment, the bonus game session may be played for a pre-determined amount of time and/or until the player meets an objective of the bonus game session. For example, an objective of the game described in Example 1 discussed above may be once the player catches a fish. In another embodiment, the amount of time the player may play the bonus game session may be based on the player's score in the primary game of chance. The time a player is allowed to play the bonus game session may be pre-determined, such as for two minutes, or based on any other criteria.

If a bonus game session has not been triggered at 606, and a wager is received to play a primary game of chance on the gaming machine at 602, another primary game of chance is operated on the gaming machine at 604. If the bonus game session has been triggered for the player at 606, then a determination of whether the player is new to the asynchronous persistent group bonus game at 608.

To determine whether the player is new to the asynchronous persistent group bonus game at 608, in one embodiment, the player might be asked to input a player identification number or insert their player loyalty card into the player tracking device on the gaming machine if the player has not previously done so. A player tracking server or bonus server may check player game data stored in memory to determine if the player has previously played the asynchronous persistent group bonus game for the asynchronous persistent group bonus game session.

Referring now to FIG. 6B, if it is determined that the player is new to the asynchronous persistent group bonus game at 608, player may register to play the asynchronous persistent group bonus game at 610. In one embodiment, the player may input a player name and password. In another embodiment, the player may simply input the player loyalty card in the player tracking device on the gaming machine. In still another embodiment, the player loyalty card may already be inserted in the player tracking device. In a further embodiment, the player can remain anonymous by entering a random ID, or request that the gaming system generate a random ID. A new record may then be created in the asynchronous persistent group bonus game database for the player.

The player account data may then be saved on a memory of the bonus server and/or player tracking device at 612. The player account data may be any information, including, but not limited to, a player identification, player password, contact information for the player, associating the player with a team, wager amount, and other data.

Referring back to FIG. 6A, if the player is not a new player to the current session of the asynchronous persistent group bonus game, then previously saved persistent bonus player data for the asynchronous persistent group bonus game may be recalled at 614. As the player plays the asynchronous persistent group bonus game, any winnings from the bonus game session may be added and updated to the previously saved persistent bonus player data. The updated persistent bonus player data may then be saved on a memory of the bonus game and/or player tracking server.

An input may be received to use at least one bonus game play asset in the asynchronous persistent group bonus game at 616. A bonus game play asset may be any asset or tool that a player may utilize in playing the asynchronous persistent group bonus game. Bonus game play assets may either be won in the primary game of chance, purchased with credits from the virtual bonus store, and/or obtained while playing the bonus game session. Assets can also be transferred from another player. In the example described above in Example 1, a bonus game play asset may include a fishing rod, boat, a lure, or any other item(s) to assist a player in catching more and bigger fish in the asynchronous persistent group bonus game. Bonus game play assets may also be implemented as a default set of assets so all players will be on an equal footing on the play field. In case of a default set of assets, a request to use a tool is not needed.

At 617, if the bonus game play assets were not a default set, a player's request to use a certain asset from the set is fulfilled.

The bonus game session may be operated at 618. The bonus game session may be displayed on a display of the local gaming machine and/or on a community display. The bonus game session continues until the bonus session ends at 620. In one embodiment, the bonus game session may end after a predetermined amount of time has elapsed. In another embodiment, the bonus game session ends when the player or team reaches a team goal. In still another embodiment, the bonus game session may end when any other bonus ending event occurs, such as the player catching a fish or completing a task. Once the bonus game session ends for the player at 620, the persistent bonus game state and other data may be updated at 622. The bonus game state data may be updated in the bonus server, player tracking server, and/or on the gaming machine itself. The bonus game state data may then be saved to the non-volatile memory on the bonus server at 624. As discussed previously, the triggering events that cause the saving of the data may be any change in the data themselves, end of the bonus session for each player, or any other conditions depending on the game or jurisdictional requirements.

In another embodiment, the asynchronous persistent group bonus game state data may also be saved to the memory on the player tracking server, the gaming machine itself, or any other network server. The asynchronous persistent group bonus game state and other data may include the persistent bonus player data, which may be updated with any new prizes the player has won while playing the asynchronous persistent group bonus game. Asynchronous persistent group bonus game state and other data may also include the persistent bonus group data, which may represent the current state of each team competing in the asynchronous persistent group bonus game, as well as the list of players associated with each team or group. Furthermore, the asynchronous persistent group bonus game state and other data may include persistent bonus world data that represents the current state of the asynchronous persistent group bonus game.

In the example discussed above in Example 1, the persistent bonus world data can include data such as total amount of fish caught by the players of each team, location of fish remaining to be caught (which may or may not be revealed to active players), and other data representing the operation of the asynchronous persistent group bonus game. All the data may be updated at 622 and saved at 624 after each individual bonus game session ends for each player. Thus, when another player enters the bonus game environment to play a bonus game session, the current state of the asynchronous persistent group bonus game may be up-to-date.

Figure 7:
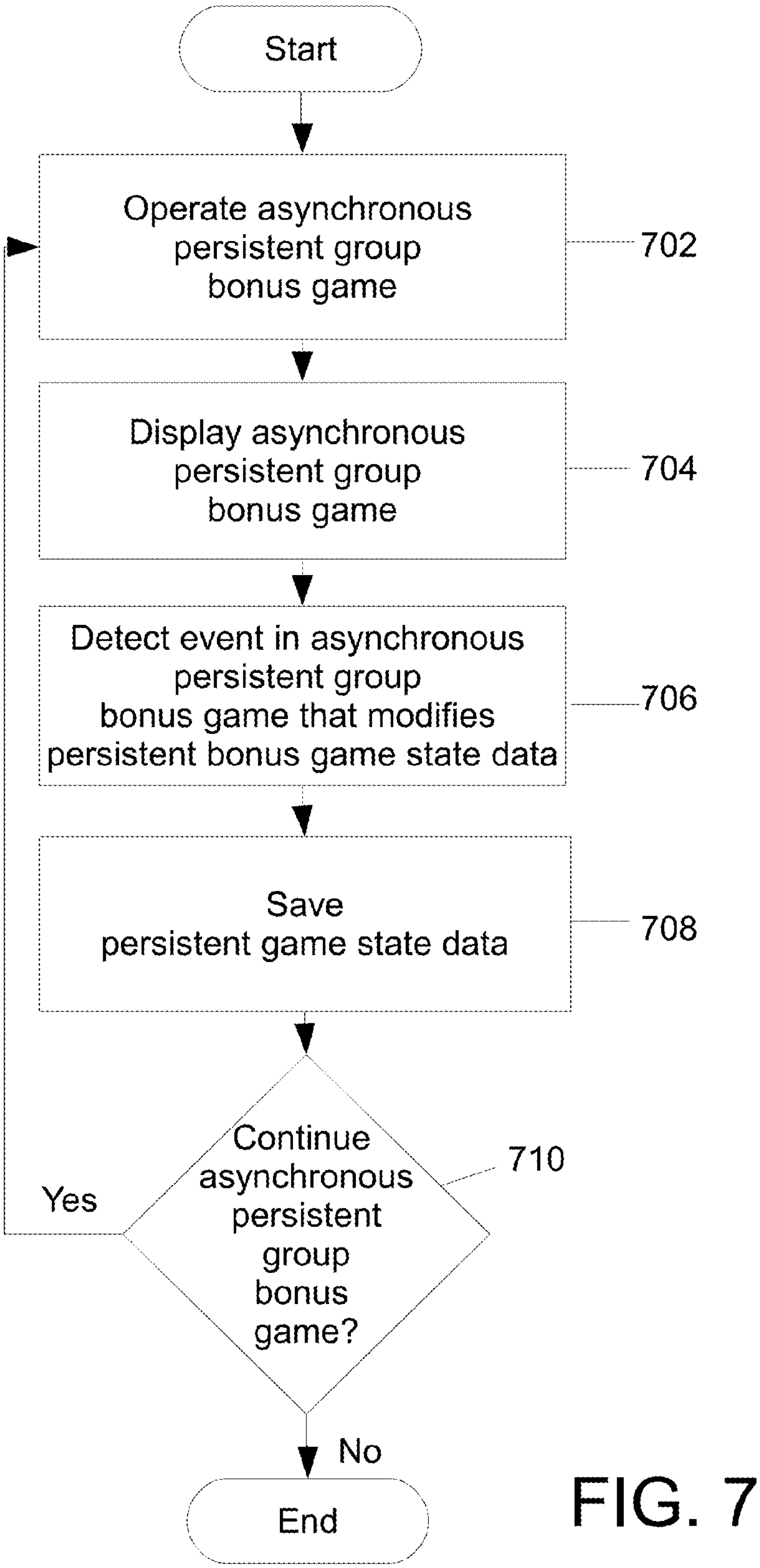
FIG. 7 is a flow chart illustrating an example operation of the asynchronous persistent group bonus game.

FIG. 7 is a flow chart illustrating an example operation of the asynchronous persistent group bonus game. An asynchronous persistent group bonus game may be operated at 702. In one embodiment, the asynchronous persistent group bonus game may be operated from a bonus server. In another embodiment, the asynchronous persistent group bonus game may be operated from the gaming server. In another embodiment, the asynchronous persistent group bonus game may be operated at the gaming machine.

The asynchronous persistent group bonus game may be displayed on a display at 704. The asynchronous persistent group bonus game may be displayed on a community display and/or on a display of a gaming machine. In another embodiment, the display may occur on a plurality of game machines, in a synchronized manner.

An event in the asynchronous persistent group bonus game may be detected that modifies the persistent bonus game state and other data at 706. As discussed before, the triggering events that cause the saving of the data may be any change in the data themselves, the end of the bonus session for each player, or other conditions depending on the game or jurisdictional requirements. Since asynchronous persistent group bonus game state and other data may include data on each player, groups, their interactions, and the entire bonus world environment, any changes to the data may qualify as an event that modifies the asynchronous persistent group bonus game state and other data. For example, a new player may enter or exit the asynchronous persistent group bonus game, a player may be added to (or removed from) a group, or a goal or objective of the asynchronous persistent group bonus game may be attained. Other events may occur that modifies the asynchronous persistent group bonus game state and other data.

The bonus game state data may be saved at 708. In one embodiment, the bonus game state data may be saved each time an event is detected at 706. In another embodiment, the bonus game state data may be saved based upon a predetermined time limit, such as every five minutes. In yet another embodiment, the constant changes in the player's local game environment (such as moving from location to location) is accumulated in the local machine's nonvolatile memory. When a significant event occurs, such as when a player catches a fish, the accumulated data for the environment is uploaded to the server in a client-server network or to designated peer machines in a peer to peer storage network.

If an asynchronous persistent group bonus game termination event has not occurred at 710, the asynchronous persistent group bonus game may continue at 702. However, if an asynchronous persistent group bonus game termination event has occurred at 710, the asynchronous persistent group bonus game ends. There are multiple levels of termination. Termination may occur at the player's level, team level, tournament level, or at the global level. The termination event may be a predetermined amount of time has elapsed, a player or group has reached the overall group goal, or any other event that terminates the asynchronous persistent group bonus game. For example, the asynchronous persistent group bonus game may continue for three months, three weeks, or three days. In another example, as described in Example 1 above, the asynchronous persistent group bonus game may continue until a team has caught 300 pounds of fish. Once the asynchronous persistent group bonus game is terminated and saved, another asynchronous persistent group bonus game may automatically start.

Figure 8:
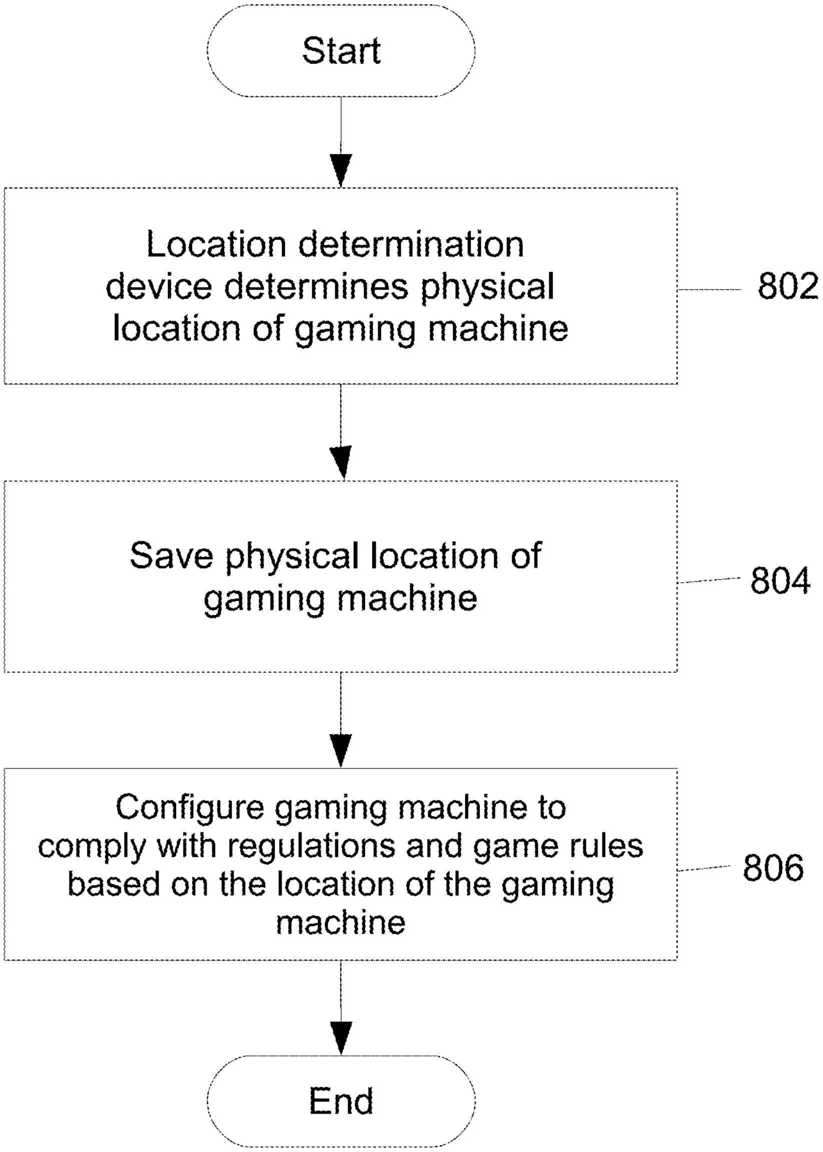
FIG. 8 is a flow chart illustrating an example method for determining the location of a gaming machine.

FIG. 8 is a flowchart illustrating an example method for determining the location of a gaming machine. A location determination device may determine the location of each of the plurality of gaming machines at 802. The location determination device may be positioned within each of the plurality of gaming machines or located on a separate server. The location determination device may determine the location of the gaming machine via a GPS, a triangulation, a trilateration, a nearby network node, or any other mechanism for determining the location of the gaming machine as discussed above.

The location of each of the plurality of gaming machines may be saved at 804. The location may be saved on a memory at a gaming server, a bonus server, a player tracking server, a location tracking server, or any other type of network server. In one embodiment, the location may also be save on a local game machine node of a peer to peer distributed storage network.

The saved location information may then be used to configure each of the plurality of gaming machines to comply with any applicable regulations and location-based game rules at 806 based on the detected location. For example, a state may have a $500 limit on the maximum amount of money a player can lose in any given day. Each gaming machine may then be configured to comply with the state law to, whether it be to play a primary game of chance or the asynchronous persistent group bonus game, refuse a player's wager to play additional games of chance after the player has lost $500 within a 24 hour period. In another example, the specific location of the gaming machine may cause the rules of the asynchronous persistent group bonus game to change, the game theme to change, localization features (e.g., city scape, casino brands) to be added or displayed on the gaming machine. For example, certain sections of the casino floor may be designated as a promotional zone where game machines are entitled to additional game benefits such as more powerful tools or additional prizes given out by $3^{rd}$ party sponsors.

Figure 9:
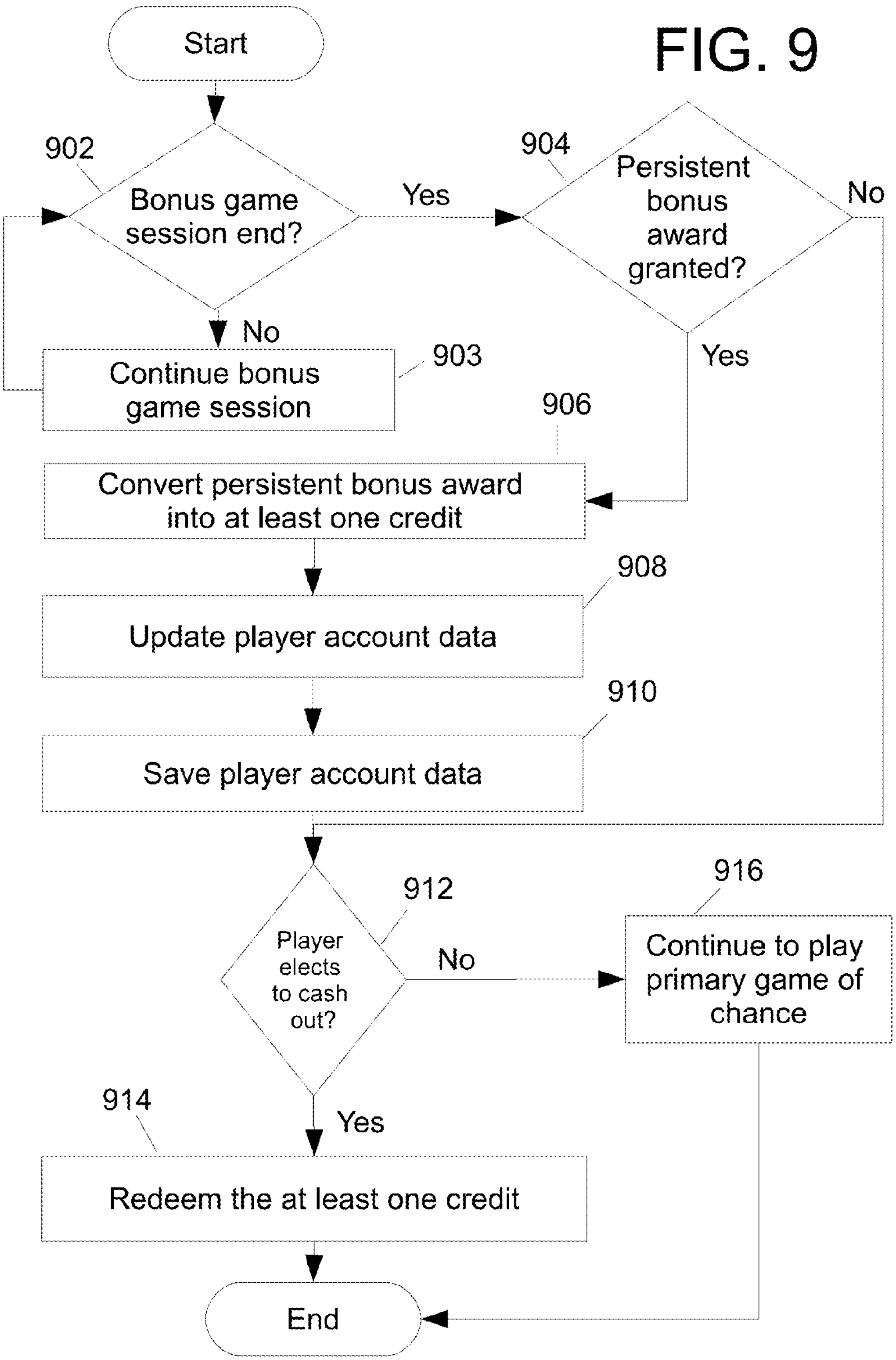
FIG. 9 is a flow chart illustrating another example method of an asynchronous persistent group bonus game.

FIG. 9 is a flowchart illustrating another example method of an asynchronous persistent group bonus game. A determination is made whether a player's bonus game session ended at 902. The bonus game session continues at 903 if it is determined that the bonus game session did not end at 902. If the bonus game session ended at 902, a determination is made if a persistent bonus award was granted at 904. The player may be awarded persistent bonus awards for certain achievements while playing the bonus game session in the asynchronous persistent group bonus game. For example, in Example 1, achievements resulting in persistent bonus awards may include catching fish of a certain weight, obtaining a certain bonus game play asset(s), completing the asynchronous persistent group bonus game within a certain amount of time, or any other criteria as desired.

If the player was granted a persistent bonus award at 904, the persistent bonus award may be converted into at least one credit at 906. The player may use the credit to play additional primary games of chance, purchase additional bonus game assets, cash out the credits, or even rolling the credits over to another game.

The player's account data may then be updated at 908 and saved in a memory at 910. The player's account data may be saved on a memory on the bonus server, player tracking server, one or more gaming machines, and/or on a gaming server. The player account data may include information such as amount of credits, assets obtained from the bonus game session, or any other player gaming or account data.

If a persistent bonus award was not granted at 904, a determination is made whether the player elected to cash out at 912 and no longer play the game of chance on the gaming machine. If the player elected to cash out at 912, the credits may be redeemed or rollover the credits to another game at 914. The credits may be redeemed for cash or non-cash assets, such as entertainment shows, food, concierge services, or any other item. If the player does not elected to cash out at 912, the player may continue to play the primary game of chance at 916 on the gaming machine.

Figure 10:
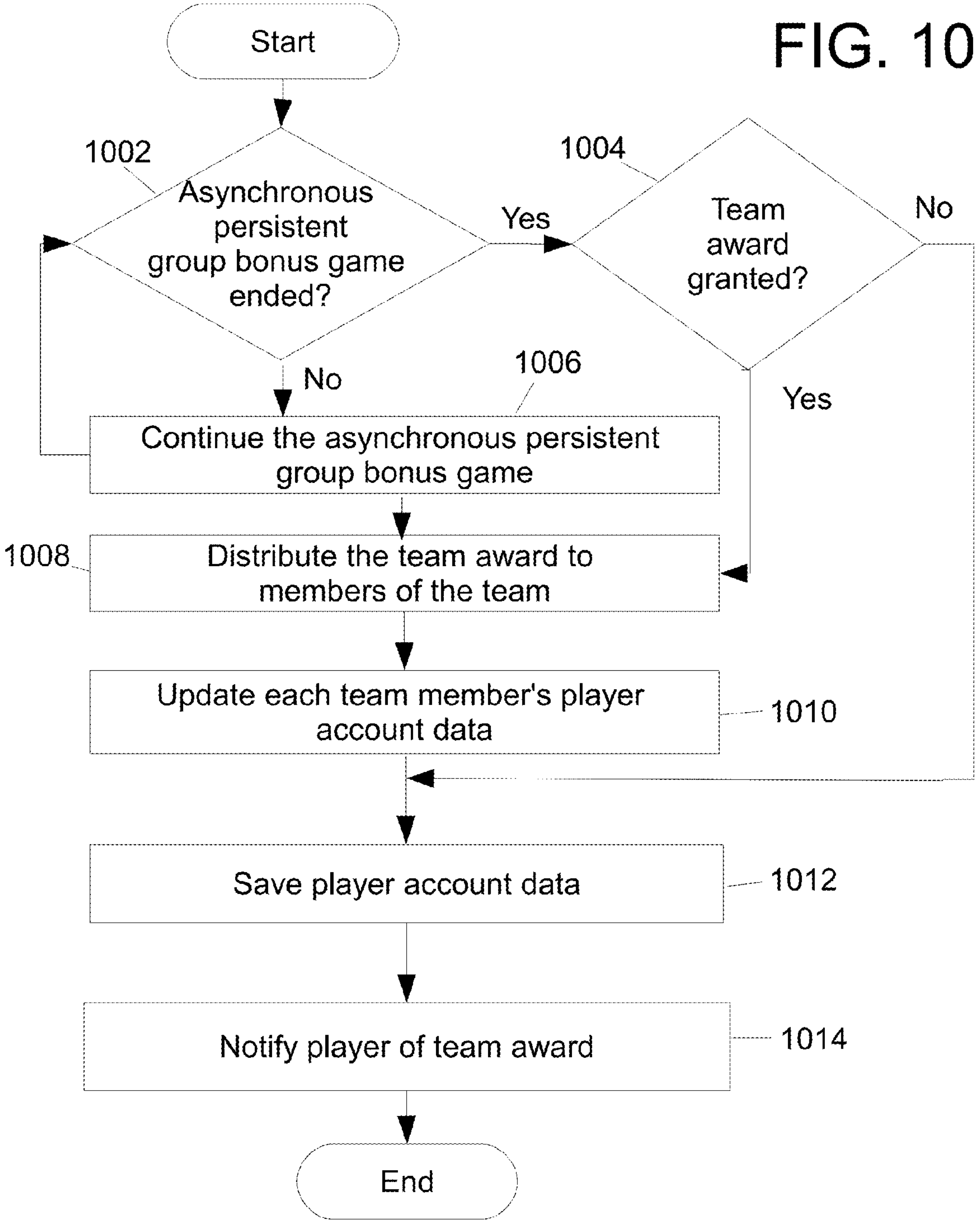
FIG. 10 is a flow chart illustrating an example method to distribute an asynchronous persistent group bonus team award.

FIG. 10 is a flow chart illustrating an example method to distribute an asynchronous persistent group bonus team award. If the asynchronous persistent group bonus game does not end at 1002, the asynchronous persistent group bonus game continues at 1006.

If the asynchronous persistent group bonus game ends at 1002, then a determination is made as to whether a team award is granted at 1004 for the team. If a team award is granted at 1004, the team award is distributed among each of the members of the team at 1008. If no team award is granted at 1004, the bonus award distribution phase may end.

The team award may be any award granted to a team at the conclusion of the asynchronous persistent group bonus game. For example, a team may be awarded a team award for being the first team to reach the overall team goal of the asynchronous persistent group bonus game. In Example 1, the team goal may be to catch 300 pounds of fish, and the first team to reach this goal may win the team award. In one embodiment, teams that come in second or third place, or any other rank, may also be awarded smaller award amounts. In other embodiments, team awards may also be awarded prior to the conclusion of the asynchronous persistent group bonus game upon certain event. For example, team awards may be obtained if a team member catches a rare fish, obtains a specific bonus game play asset, or any other criteria.

In another embodiment, any bonus game asset each team member acquired while playing the asynchronous persistent group bonus game may be converted and added to the team award or to the individual player's distributed team award amount. For example, based on Example 1, if the team has three racing boats, the team award may be increased by a predetermined amount, such as $1,000.00. Alternatively, each player having the race boat may have an additional predetermined amount added to their distributed team amount, such as an additional $500.00.

The team award may be distributed among the members of the team at 1008 based on any criteria, such as, the proportional contribution of each team member towards the overall team goal, the amount of time played by each player, the amount of bonus game play assets accumulated by each player, randomly, or any other criteria.

Once the team award is distributed, each player's account data may be updated at 1010 and saved at 1012. The player account data may be saved on a memory at the gaming server, player tracking server, bonus server, gaming machine, or any other network server. The player's account data may include any information as discussed above.

There could be many collaboration games, competition games between teams, or individual games occurring simultaneously in the same asynchronous persistent bonus group game environment. Thus, a termination of one local competition tournament does not necessarily terminate the global asynchronous persistent group bonus game.

While embodiments and applications of this invention have been shown and described, it would be apparent to those skilled in the art having the benefit of this disclosure that many more modifications than mentioned above are possible without departing from the inventive concepts herein.

What is claimed is:

1. A system for preserving persistent bonus game state data for an asynchronous persistent group bonus game, comprising:

a plurality of gaming machines associated with the asynchronous persistent group bonus game, each of the plurality of gaming machines including:
- at least one processor,
- at least one input device,
- at least one display,
- at least one local non-volatile memory configured to store a plurality of instructions, which when executed by the at least one processor, causes the at least one processor to operate with the at least one display and the at least one input device to enable a player to play a primary game of chance upon receipt of a wager; and at least one network server having at least one processor and at least one non-volatile memory, the at least one processor configured to communicate with each of the plurality of gaming machines via a network to:
- determine whether a bonus game session is triggered on any of the plurality of gaming machines; and
- if the bonus game session is triggered:
  - cause the asynchronous persistent group bonus game to be displayed for any gaming machine that has triggered the bonus game session;
  - modify the persistent bonus game state data when an event occurs in the asynchronous persistent group bonus game;
  - save the persistent bonus game state data in the at least one non-volatile memory; and
  - transmit data to at least one of the plurality of gaming machines, in addition to the gaming machine that triggered the bonus game session, to display the asynchronous persistent group bonus game on the at least one display thereof, wherein the persistent bonus game state data includes at least global persistent bonus game state data and local persistent bonus game state data, and wherein a plurality of players are able to concurrently play the asynchronous persistent group bonus game.

2. The system of claim 1, wherein the gaming machine is configured to transmit primary player data to the at least one network server, and the at least one network server is configured to transmit persistent bonus game state data associated with the player data to at least one of the plurality of gaming machines.

3. The system of claim 1, wherein the at least one network server is configured to transmit data to at least one of the plurality of gaming machines to display the asynchronous persistent group bonus game on the at least one display thereof.

4. The system of claim 1, wherein the at least one network server comprises or couples to a bonus game database configured to store persistent bonus game state data.

5. The system of claim 4, wherein if the bonus game session is triggered, the at least one processor configured to determine whether the player is a new player to the asynchronous persistent group bonus game, wherein previously saved persistent bonus player data is obtained from the bonus game database, if it is determined that the player is not a new player to the asynchronous persistent group bonus game, and wherein the previously saved persistent bonus player data allows the player to play the bonus game session using bonus game play assets obtained from the player's previous play of the asynchronous persistent group bonus game.

6. The system of claim 1, further comprising:

at least one locator device to determine a location of each of the plurality of gaming machines, the at least one locator device configured to communicate with the at least one network server via the network.

7. The system of claim 6, wherein the at least one network server is configured to configure each of the plurality of gaming machines in accordance with at least one location based characteristic based on the location of the gaming machine.

8. The system of claim 1, wherein the at least one network server is on a peer-to-peer network.

9. The system of claim 1, wherein the at least one network server is a bonus server.

10. A method for preserving persistent bonus game state data for an asynchronous persistent group bonus game on at least one network server configured to communicate with a plurality of gaming machines, the plurality of gaming machines being configured to receive a wager from a player to play a primary game of chance on the plurality of gaming machines, each of the plurality of gaming machines including at least one processor, the method comprising:

receiving, at one of the plurality of gaming machines, a request to play the primary game of chance;

determining, at the one of the plurality of gaming machines, if a bonus game session is triggered, wherein upon the triggering of the bonus game session:

obtaining persistent bonus game state data for an asynchronous persistent group bonus game from the at least one network server, the at least one network server having at least one non-volatile memory associated therewith and configured to store the persistent bonus game state data for the asynchronous persistent group bonus game;

receiving an input to use at least one bonus game play asset to play the asynchronous persistent group bonus game during the bonus game session, the at least one bonus game play asset obtained during play of the current bonus game session or a previous bonus game session;

determining whether a game state saving event occurs; and saving a persistent bonus player data in the at least one non-volatile memory associated with the at least one network server when it is determined that the game state saving event occurred, wherein the asynchronous persistent group bonus game includes at least global persistent bonus game state data and local persistent bonus game state data, and wherein a plurality of players are able to concurrently play the asynchronous persistent group bonus game.

11. The method of claim 10, further comprising saving a persistent bonus world data on the at least one non-volatile memory when it is determined that the game state saving event occurred.

12. The method of claim 10, further comprising:

determining if another bonus game session is triggered for a player; and recalling the saved persistent bonus player data from the at least one non-volatile memory if it is determined that another bonus game session is triggered, wherein the saved persistent bonus player data allows the player to play the bonus game session using at least one bonus game play asset obtained from the player's previous play of a bonus game session of the asynchronous persistent group bonus game.

13. The method of claim 12, further comprises receiving an input to use a bonus game play asset to play the asynchronous persistent group bonus game.

14. The method of claim 10, further comprising:

updating a player account data based upon the persistent bonus player data from the bonus game session; and saving the player account data on the at least one non-volatile memory.

15. A non-transitory program storage device readable by a machine tangibly embodying a program of instructions executable by the machine to perform a method for preserving persistent bonus game state data for an asynchronous persistent group bonus game on at least one network server configured to communicate with a plurality of gaming machines, the plurality of gaming machines being configured to receive a wager from a player to play a primary game of chance on the plurality of gaming machines, comprising:

receiving a request to play the primary game of chance;

determining if a bonus game session is triggered, wherein upon the triggering of the bonus game session:

obtaining persistent bonus game state data for an asynchronous persistent group bonus game from a network server, the network server accessing at least one non-volatile memory configured to store the persistent bonus game state data for the asynchronous persistent group bonus game; and receiving an input to use at least one bonus game play asset to play the asynchronous persistent group bonus game during the bonus game session, the bonus game play asset obtained during play of the current bonus game session or a prior bonus game session;

determining whether a game state saving event occurs; and saving a persistent bonus player data on the at least one non-volatile memory when it is determined that the game state saving event occurred, wherein the persistent bonus game state data for the asynchronous persistent group bonus game includes at least global persistent bonus game state data and local persistent bonus game state data, and wherein a plurality of players are able to concurrently play the asynchronous persistent group bonus game.

16. A method for preserving persistent bonus game state data for an asynchronous persistent group bonus game on at least one network server configured to communicate with a plurality of gaming machines, the plurality of gaming machines being configured to receive a wager from a player to play a primary game of chance on the plurality of gaming machines, each of the plurality of gaming machines including at least one processor, comprising:

operating an asynchronous persistent group bonus game on the at least one network server;

receiving a request from at least one of the plurality of gaming machines to play the asynchronous persistent group bonus game, the request following playing of the primary game of chance on the at least one of the plurality of gaming machines and having a group bonus game triggered;

displaying the asynchronous persistent group bonus game on a display of the at least one of the plurality of gaming machines, the asynchronous persistent group bonus game providing global persistent bonus game state data and local persistent bonus game state data;

detecting, on at least one of the plurality of gaming machines, an event in the asynchronous persistent group bonus game that modifies the local persistent bonus game state data for the asynchronous persistent group bonus game;

saving the global and local persistent bonus game state data in at least one non-volatile memory, the at least one non-volatile memory stored being in or coupled to the at least one network server; and concurrently displaying the global and local asynchronous persistent bonus game state data on another display other than the display of the at least one of the plurality of gaming machines, wherein a plurality of players are able to concurrently play the asynchronous persistent group bonus game.

17. The method of claim 16, wherein the another display is a community display.

18. The method of claim 16, wherein the detecting an event comprises receiving an input to use a bonus game play asset to play the asynchronous persistent group bonus game.

19. The method of claim 16, wherein the saving further comprises:

saving persistent bonus group data, wherein the persistent bonus group data includes information about at least one team.

20. The method of claim 16, wherein the saving further comprises:

saving persistent bonus world data, wherein the persistent bonus world data includes information about a bonus game environment of the asynchronous persistent group bonus game.

21. The method of claim 16, further comprising:

converting a persistent bonus award into at least one credit;

updating a player account data with the at least one credit; and subsequently, on request, redeeming the at least one credit for a monetary value or other non-monetary prize.

22. The method of claim 16, further comprising:

converting a persistent group award into at least one credit;

distributing the at least one credit among players who are members of a group that has won a persistent group award in the asynchronous persistent group bonus game; and subsequently, on request, redeeming the at least one credit for a monetary value or other non-monetary prize.

23. A non-transitory program storage device readable by a machine tangibly embodying a program of instructions executable by the machine to perform a method for preserving persistent bonus game state data for an asynchronous persistent group bonus game on at least one network server configured to communicate with a plurality of gaming machines, the plurality of gaming machines being configured to receive a wager from a player to play a primary game of chance on the plurality of gaming machines, comprising:

operating an asynchronous persistent group bonus game from at least one network server, the asynchronous persistent group bonus game having global persistent bonus game state data and local persistent bonus game state data;

receiving a request from at least one of the plurality of gaming machines operating the primary game of chance to participate in the asynchronous persistent group bonus game saving the persistent bonus game state data on at least one non-volatile memory, the at least one non-volatile memory being accessible by the at least one network server; and displaying the global persistent bonus game state data on another display other than the displays associated with the plurality of gaming machines, wherein a plurality of players are able to concurrently play the asynchronous persistent group bonus game.

24. The program storage device of claim 23 further comprising opening a new player session for the at least one gaming machine if the previous player game session data does not exist.

25. A non-transitory program storage device readable by a machine tangibly embodying a program of instructions executable by the machine to perform a method for preserving persistent bonus group game state data for an asynchronous persistent group bonus game on at least one network server configured to communicate with a plurality of gaming machines, the plurality of gaming machines being configured to receive a wager from a player to play a primary game of chance on the plurality of gaming machines, comprising:

receiving a request to open a player session for the asynchronous persistent group bonus game from at least one of the plurality of gaming machines, the request following playing of the primary game of chance on the at least one of the plurality of gaming machines and having a group bonus game triggered;

determining if existing player game session data is associated with the player session;

sending the existing player game session data to the at least one gaming machine if existing player game session data exists, the existing player game session data includes bonus game play assets obtained from the player's previous play of the asynchronous persistent group bonus game, the persistent group bonus game state data for the asynchronous persistent group bonus game including at least global persistent group bonus game state data and local persistent group bonus game state data;

receiving a request to save at least the local persistent group bonus game data for the player session; and saving, in response to the received request to save, at least the local persistent group bonus game data on at least one non-volatile memory accessible by the at least one network server, wherein a plurality of players are able to concurrently play the asynchronous persistent group bonus game.

* * * * *